(12) United States Patent
Plenos et al.

(10) Patent No.: US 10,936,563 B2
(45) Date of Patent: Mar. 2, 2021

(54) SYSTEM AND METHOD FOR MERGING A SOURCE DATA FROM A SOURCE APPLICATION INTO A TARGET DATA OF A TARGET APPLICATION

(71) Applicant: Yokogawa Electric Corporation, Musashino (JP)

(72) Inventors: Haydee Lavisores Plenos, Singapore (SG); Ying Tzu Huang, Singapore (SG)

(73) Assignee: Yokogawa Electric Corporation, Tokyo (JP)

( * ) Notice: Subject to any disclaimer, the term of this patent is extended or adjusted under 35 U.S.C. 154(b) by 242 days.

(21) Appl. No.: 15/631,398

(22) Filed: Jun. 23, 2017

(65) Prior Publication Data

US 2018/0373740 A1    Dec. 27, 2018

(51) Int. Cl.
| | |
|---|---|
| *G06F 16/21* | (2019.01) |
| *G06F 16/27* | (2019.01) |
| *G06F 16/25* | (2019.01) |
| *G06F 16/2453* | (2019.01) |
| *G06F 16/22* | (2019.01) |
| *G06F 16/54* | (2019.01) |
| *G06F 9/54* | (2006.01) |

(52) U.S. Cl.
CPC .......... *G06F 16/217* (2019.01); *G06F 16/211* (2019.01); *G06F 16/2453* (2019.01); *G06F 16/258* (2019.01); *G06F 16/273* (2019.01); *G06F 9/54* (2013.01); *G06F 16/22* (2019.01); *G06F 16/25* (2019.01)

(58) Field of Classification Search
None
See application file for complete search history.

(56) References Cited

U.S. PATENT DOCUMENTS

| | | | |
|---|---|---|---|
| 9,430,114 B1* | 8/2016 | Dingman | G06F 16/211 |
| 2009/0276072 A1 | 11/2009 | Grove et al. | |
| 2010/0057673 A1 | 3/2010 | Savov | |
| 2013/0086124 A1* | 4/2013 | Bahl | G06F 16/258 |
| | | | 707/802 |

(Continued)

OTHER PUBLICATIONS

Cong Yu; Semantic Adaptation of Schema Mappings when Schemas Evolve ; 2005; 31st VLDB Conference; pp. 1006-1017.*

(Continued)

*Primary Examiner* — Mariela Reyes
(74) *Attorney, Agent, or Firm* — Sughrue Mion, PLLC

(57) ABSTRACT

A control system in an industrial plant is configured to determine whether the source data extracted from the source application is not matched in data structure with the target application, and to transform the source data structure to be matched with the target data structure in accordance with a data structure requirement of the target application if the source data is not matched in data structure with the target data in the target application. The industrial plant control system is configured to perform a hierarchical checking of the data structure between the target application and the source application in a correlated definition status, and perform at least one of updating, deleting and adding the source data from the source application, based at least in part on a result of the hierarchical checking for merging the source data into the target data in the target application.

26 Claims, 14 Drawing Sheets

(56) References Cited

U.S. PATENT DOCUMENTS

| | | |
|---|---|---|
| 2013/0179772 A1 | 7/2013 | Nakamura |
| 2013/0226944 A1* | 8/2013 | Baid ...................... G06F 16/88 |
| | | 707/756 |
| 2013/0246376 A1 | 9/2013 | Padmanabhan et al. |
| 2016/0321307 A1 | 11/2016 | Dingman et al. |
| 2018/0150528 A1* | 5/2018 | Shah ................... G06F 16/282 |
| 2018/0210905 A1* | 7/2018 | Coleman ............... G06F 16/254 |

OTHER PUBLICATIONS

Extended European Search Report dated Jul. 16, 2018 in EP Application No. 18170547.6.
Communication dated Jan. 28, 2020 from European Patent Office in EP Application No. 18 170 547.6.

* cited by examiner

FIGURE BASIC SYSTEM CONFIGURATION EXAMPLE OF AD SUITE

FIG. 6B

Sample of Data Transform (Combine) in product

SubModule/Signal (systemTag="606be7b1-856f-4e28-8144-de8da14cfc6c", displayName="Safe sensor buffer")

| systemTag | displayName | signalType | signalAccessPath | opc | dataType | arrayElements | F_Trailer |
|---|---|---|---|---|---|---|---|
| efac7edd-1bd5-4419-8bc0-237cbe0e574e | LEL_STATUS | input | 0 | 0 | unsigned8 | | |
| ad8e13df-c9d4-4ce8-8e9d-6ea4331e3a6e | LEL | input | 1 | 0 | real32 | | |
| 0d71eb33-d0ca-4230-b944-6d2439db322d | Input_4_bytes_Safety | input | 5 | 0 | byte | 4 | 1 |
| 63bd9ed9-fe13-451f-a5bb-c8fcac260a66 | Output_4_bytes_Safety | output | 0 | 0 | byte | 4 | 1 |

Status/Signal

| systemTag | displayName | signalType | signalAccessPath | dataType | opc | blockNumber | nodeReference | signalTypeEx |
|---|---|---|---|---|---|---|---|---|
| B1EAEB61-5A36-4eb2-8CDD-F62940ABF6FC | Communication Change of State | input | 0 | unsigned32 | 0 | | | |
| 5E02204A-7237-415a-BA57-B45B28EE9E56 | Communication State | input | 4 | unsigned32 | 0 | | | |
| 00010001-0001-4885-BC74-0CD700A9FE9F | yfgw410-01_Slot1_SubSlot1_Input_IOPS | input | 31 | byte | 0 | 1000 | 606be7b1-856f-4e28-8144-de8da14cfc6c | 300 |
| 00010001-0001-4897-876D-B7EEB0BD860F | yfgw410-01_Slot1_SubSlot1_Output_IOPS | output | 8 | byte | 1 | 1000 | 606be7b1-856f-4e28-8144-de8da14cfc6c | 302 |
| 00010001-0001-4885-CD12-0CD700A9FA9F | yfgw410-01_Slot1_SubSlot1_Input_IOCS | input | 29 | byte | 5 | 1000 | 606be7b1-856f-4e28-8144-de8da14cfc6c | 300 |
| 00010001-0001-4897-EB13-B7EEB0BD98AE | yfgw410-01_Slot1_SubSlot1_Output_IOCS | output | 5 | byte | 0 | 1000 | 606be7b1-856f-4e28-8144-de8da14cfc6c | 302 |

⇒ Transforming to Target Application's Requirement

| displayName | dataType | signalType | wiring | dataAddress | IOPS Address | IOCS Address |
|---|---|---|---|---|---|---|
| LEL_STATUS | U8 | 0 | 1 | 0 | 31 | 29 |
| % LEL | F32 | 0 | 1 | 1 | 31 | 29 |
| Input_4_bytes_Safety | F_MessageTrailer4Byte | 0 | 0 | 5 | 31 | 29 |
| Output_4_bytes_Safety | F_MessageTrailer4Byte | 1 | 0 | 0 | 8 | 5 |

FIG. 7

Table 1

Data Structure of Source Data:

| Source Application's Hierarchy | | | |
|---|---|---|---|
| Controller | Device | -* | -* |
| | Device | Slot | -* |
| | Device | Slot | SubSlot |
| | Device | Slot | SubSlot |
| | | Slot | SubSlot |
| | | ... | ... |
| | Device | Slot | SubSlot |
| | | | ... |
| | | Slot | SubSlot |
| | | | ... |
| | | ... | ... |
| | ... | ... | ... |

*hyphen represents No Slot or SubSlot

Data Structure of Target Data:

| Target Application's Hierarchy | | | | |
|---|---|---|---|---|
| Group A | Group B | Device | Slot | SubSlot |
| | Group B | Device | Slot | SubSlot |
| | Group B | Device | Slot | SubSlot |
| | Group B | Device | Slot | SubSlot |
| ... | ... | ... | ... | ... |

FIG. 8

Table 2

Data Structure of Source Data:

| Source Data (Example) | | | |
|---|---|---|---|
| | Device Name | Slot | SubSlot |
| Controller | Device1 | 1 | 1 |
| | | | 2 |
| | | 2 | 1 |
| | | | 2 |
| | Device2 | 1 | 1 |
| | | 2 | 1 |

Data Structure of Target Data:

| Target Application's Existing Data (Example) | | | | |
|---|---|---|---|---|
| Group A Name | Group B Name | Device Name | Slot | SubSlot |
| A1 | B1 | Device1 | 1 | 1 |
| | B2 | Device1 | 1 | 3 |
| | B3 | Device1 | 3 | 1 |
| | B4 | Device3 | 1 | 1 |
| | B5 | Device3 | 2 | 1 |

FIG. 9

Table 3

| Source Application |
|---|
| Device Name |
| Device1 |
| Device2 |

| Target Application ||
|---|---|
| Group B Name | Device |
| B1 | Device1 |
| B2 | Device1 |
| B3 | Device1 |
| B4 | Device3 |
| B5 | Device3 |

FIG. 10

Table 4

| Group B Name | Device Name | Slot | SubSlot |
|---|---|---|---|
| B6 | Device2 | 1 | 1 |
| B7 | Device2 | 2 | 1 |

FIG. 11

Table 5

| Source Application ||
|---|---|
| Device Name | Slot |
| Device1 | 1 |
|  | 2 |

| Target Application |||
|---|---|---|
| Group B Name | Device Name | Slot |
| B1 | Device1 | 1 |
| B2 | Device1 | 1 |
| B3 | Device1 | 3 |

*FIG. 12*

Table 6

| Source Application | | | Target Application | | | |
|---|---|---|---|---|---|---|
| Device Name | Slot | SubSlot | Group B Name | Device Name | Slot | SubSlot |
| Device1 | 1 | 1 | B1 | Device1 | 1 | 1 |
|  |  | 2 | B2 | Device1 | 1 | 3 |

*FIG. 13*

Table 7

End Result:

| Target Application's Data - After merging | | | | |
|---|---|---|---|---|
| Group A Name | Group B Name | Device Name | Slot | SubSlot |
| A1 | B1 | Device1 | 1 | 1 |
|  | B10 | Device1 | 1 | 2 |
|  | B8 | Device1 | 2 | 1 |
|  | B9 | Device1 | 2 | 2 |
|  | B6 | Device2 | 1 | 1 |
|  | B7 | Device2 | 2 | 1 |

SYSTEM AND METHOD FOR MERGING A SOURCE DATA FROM A SOURCE APPLICATION INTO A TARGET DATA OF A TARGET APPLICATION

TECHNICAL FIELD

Embodiments of the present invention generally relate to a method, a system and a computer-program product for merging a source data from a source application into a target data of a target application.

BACKGROUND ART

In a typical engineering operation in an industrial plant, there can be multiple engineering applications involved in order to carry out specific engineering tasks. For instance, the engineering application (Automation Engineering System) may use data from another engineering application (source application Y) to be integrated and/or checked against its own sets of data.

In order for the target application (Automation Engineering System) to use the data from another application (Application Y), the user of both applications must manually export or save the data of another application (Application Y) to an external file for it to be manually imported to the target application (Automation Engineering System).

This importing of data can be done via one of the editors (Communication I/O Editor) of the target application (Automation Engineering System) where it retrieves data from the source, which is usually an external file, and requires user to identify the data to be imported. This identifying can be tedious, time-consuming and error-prone, resulting to lower productivity of the users in the long run.

For example, a parameter of a device (SUBMODULE) is configured via the editor of another application. This parameter also exists in the editor (Communication I/O Editor). To update this parameter data in the editor (Communication I/O Editor), users need to export the data from another application (Application Y) to an external file, and then import this file to the editor. During import, the user may import this parameter with some other parameter settings of the device. Moreover, if the parameter already exists in the editor (Communication I/O Editor), to update it with the latest data, the user needs to identify the corresponding import parameter from the external file.

After importing, the data may be loaded (displayed) in the target application to let user select partial data to be kept/merged in the target application. In prior art, identification is done by user (user knows the corresponding names of parameters in the import file and target application), application just loads whatever in the input file. And since a typical industrial plant has thousands of field devices, the design data exported by the many applications for the plant is significantly large. To identify which data to import from which application, and which existing data requires update, is confusing and requires a lot of effort.

U.S. Pat. No. 8,464,227B discloses as shown in FIG. 1 that it takes input script(s) to process and generate an output script. The system has a script editor interface facilitating specifying scripts for objects, where the script editor interface supports multiple distinct user-side script languages.

EP3101489A1 discloses as shown in FIG. 2 that it load a first script, and compiling the first script to form a second script, the second script structured in accordance with a vendor-specific configuration language associated with a particular process control system for the process plant.

As shown in FIG. 3, it is common way hat import external file to target application. Target application load and map the external file with existing data. A user identifies desired data. Data is changed (updated/added/deleted) based on user's selection.

Each of U.S. Pat. No. 8,464,227B2 and EP3101489A1 takes input data to process and generates an output data. There is no handling for existing data mentioned. The extra user steps involved to have the file exported and then imported. If target application does not need all of the data from another application, the user must painstakingly sift through all of the latter's data and import only those data that application A as a target application needs. User knowledge is necessary to identify which data to import. Multiple import files are confusing and will be difficult to manage in the long run.

SUMMARY

In some embodiments, a method is performed by a control system in an industrial plant. The control system comprising one or more hardware processors and one or more software components to be executed by the one or more hardware processors, The method includes determining whether the source data extracted from the source application is not matched in data structure with the target application. The method includes transforming the source data structure to be matched with the target data structure in accordance with a data structure requirement of the target application if the source data is not matched in data structure with the target data in the target application. The method includes performing a hierarchical checking of the data structure between the target application and the source application in a correlated definition status. The method includes performing at least one of updating, deleting and adding the source data from the source application, based at least in part on a result of the hierarchical checking for merging the source data into the target data in the target application.

BRIEF DESCRIPTION OF THE DRAWINGS

FIG. 6B is a view of an illustrative example of the process of combining a plurality of sets of source data into a single combined set of source data to be merged with the target data.

FIG. 7 through FIG. 13 are data tables showing source data structure and target data structure in each of the steps of the extract, the transform, the refine and the merge as shown in FIG. 5.

EMBODIMENTS

Figure 1:
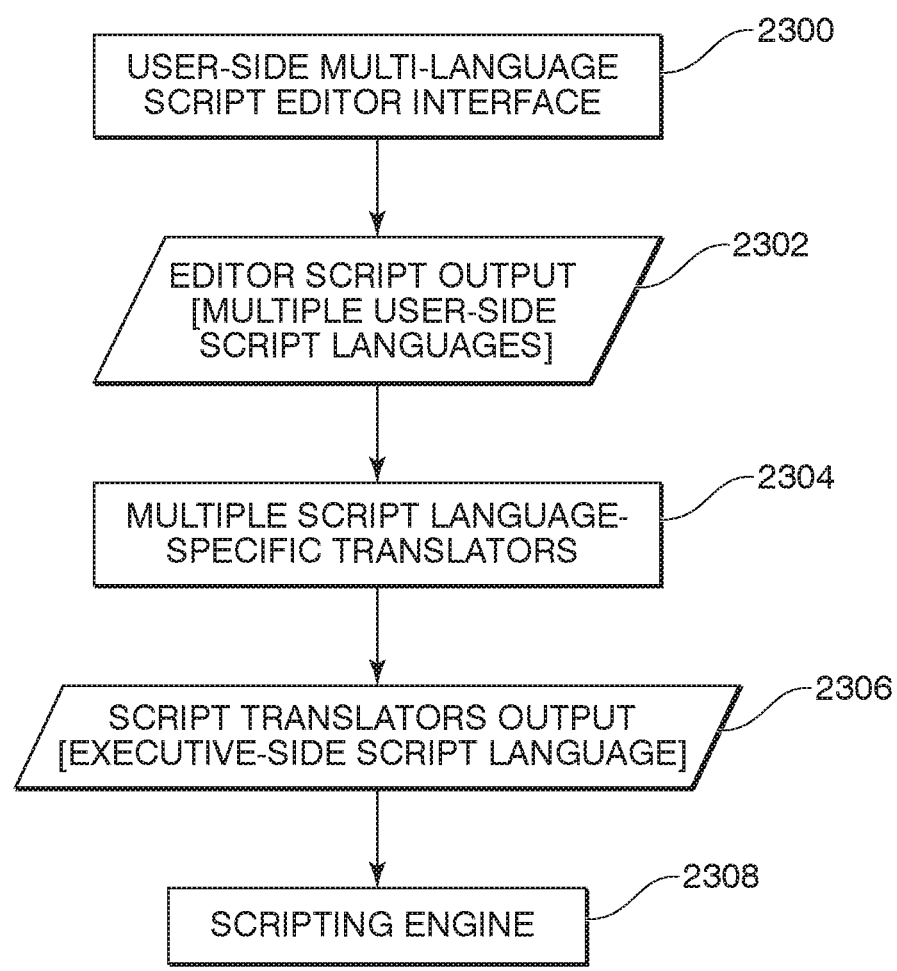
FIG. 1 is a flow chart of a method of exporting outside data from other application in related art.
Figure 2:
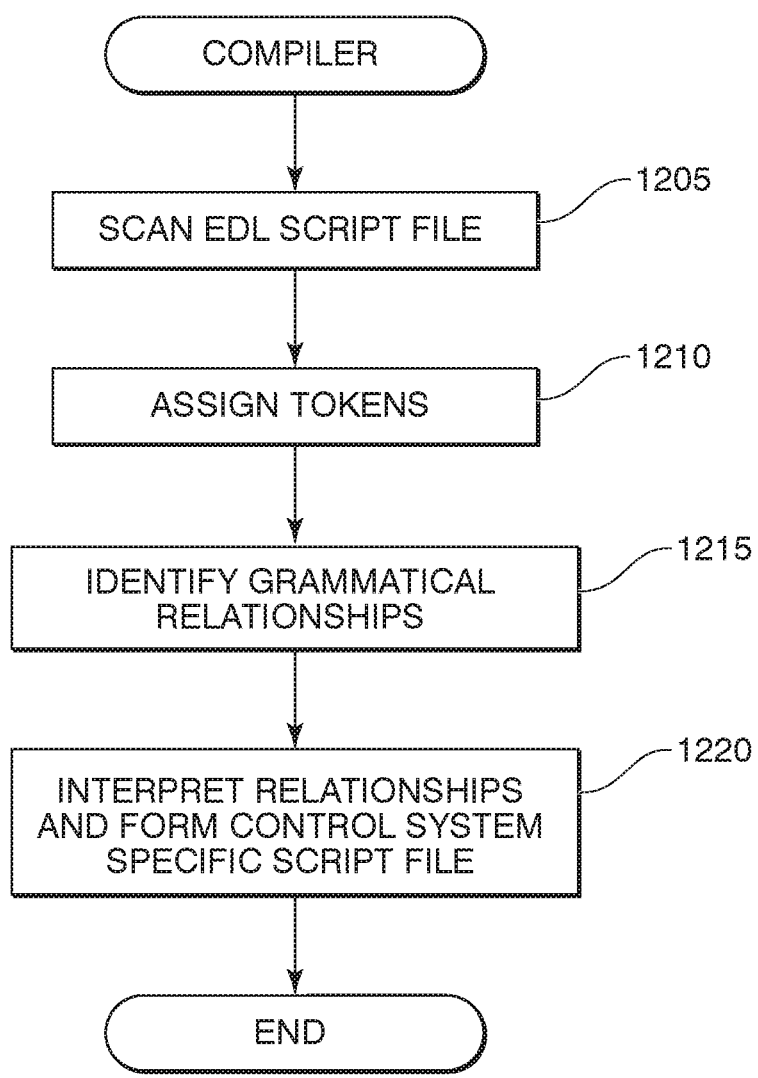
FIG. 2 is a flow chart of a method of exporting outside data from other application in related art.
Figure 3:
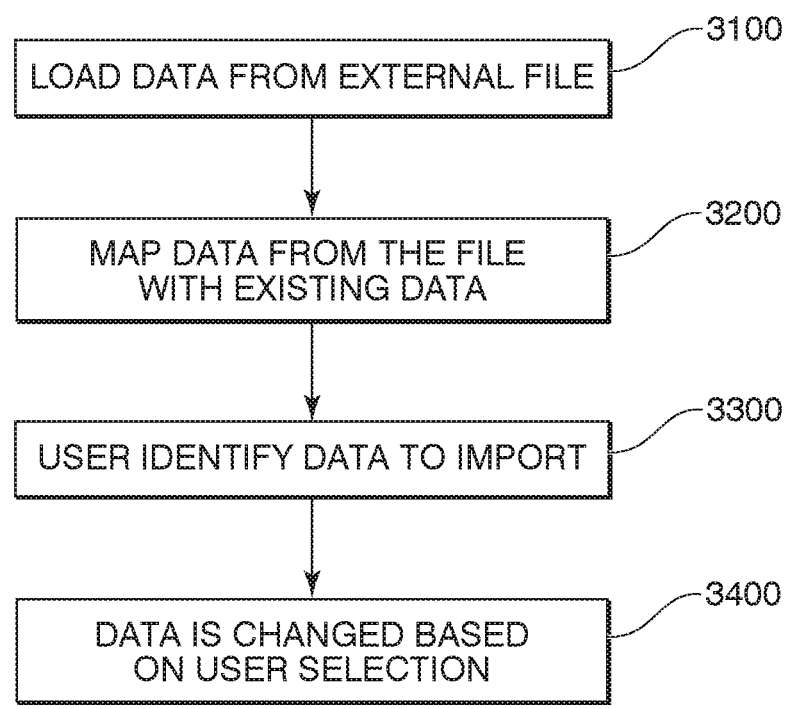
FIG. 3 is a flow chart of a method of exporting outside data from other application in related art.

[Overalls of System and Method for Merging Source Data in Source Application into Target Data in Target Application]

There will be described hereafter overalls of a system and a method for merging source data in source application into target data in target application.

In some embodiments, a computer-implemented method may be performed by a control system in an industrial plant, the control system comprising one or more hardware processors and one or more software components to be executed by the one or more hardware processors. The method may include, but is not limited to, extracting, based at least in part on a requirement by the target application, source data from a source application; determining whether or not at least a part of the source data extracted from the source application is not matched in terms of data structure with at least a part of target data in the target application; transforming the source data structure to be matched with the target data structure in accordance with a data structure requirement of the target application if it is determined that the at least part of the source data is not matched in terms of data structure with the at least a part of the target data in the target application: performing a hierarchical checking of the data structure between the target application and the source application in a correlated definition status which refers to target parameters of at least one of the target application and a target data file and which refers to source parameters of at least one of the source application and a source data file; and performing at least one of updating, deleting and adding the source data from the source application, based at least in part on a result of the hierarchical checking for merging the source data into the target data in the target application.

In some cases, extracting the source data from the source application may include, but is not limited to: selecting the source data from the source application; determining whether or not the source data selected is supportable in accordance with a predefined industrial communication protocol of a process field network by the target application; and validating the source data selected if it is determined that the source data selected is supportable in accordance with the predefined industrial communication protocol by the target application.

In some cases, determining whether or not the source data selected is supportable may include, but is not limited to: determining an extracting rule set under a supporting condition supported by the target application, the supporting condition comprising the predefined industrial communication protocol, wherein determining whether or not the source data selected is supportable comprises determining whether or not the source data selected is supportable in accordance with the extracting rule set.

In some cases, performing the hierarchical checking of the data structure in the correlated definition status may include, but is not limited to: performing a level-by-level comparison in the hierarchical structure between the source application and the target application in terms of the correlated definition status which refers to the target parameters of the at least one of the target application and the target data file and which refers to the source parameters of the at least one of the source application and the source data file.

In some cases, performing the level-by-level comparison in the hierarchical structure between the source application and the target application further may include, but is not limited to: determining whether or not there is satisfied a first condition that a main group acquired from the target application has subordinate-groups acquired from the target application, wherein the subordinate-groups are subordinate to the main group; determining whether or not there is satisfied a second condition that the source data extracted from the source application has a data set of at least a device; and performing the level-by-level comparison in the hierarchical structure between the source data extracted from the source application and existing data in the subordinate-groups from the target application if it is determined that there are satisfied both the first condition and the second condition.

In some cases, performing the level-by-level comparison between the source data extracted from the source application and the existing data in the subordinate-groups from the target application if it is determined that there are satisfied both the first condition and the second condition may include, but is not limited to: determining whether or not the source data having the data set of the at least device is present in any of the subordinate-groups; determining if the at least device has at least a sub-module of the at least device if it is determined that the source data having the at least device is not present in any of the subordinate-groups; creating new different subordinate-groups which are subordinate to the main group if it is determined that the at least device has the at least sub-module;

In some cases, performing the level-by-level comparison between the source data extracted from the source application and the existing data in the subordinate-groups from the target application if it is determined that there are satisfied both the first condition and the second condition may include, but is not limited to: determining whether or not the subordinate-group having an associated data set of the at least device is present in the source data; marking the subordinate-group for deletion if it is determined that the subordinate-group having the associated data set of the at least device is not present in the source data; determining whether or not there is any of the subordinate-groups marked for deletion; and deleting the subordinate-group marked for deletion or the subordinate-groups marked for deletion if it is determined that there is any of the subordinate-groups for deletion.

In some cases, performing the level-by-level comparison between the source data extracted from the source application and the existing data in the subordinate-groups from the target application if it is determined that there are satisfied both the first condition and the second condition may include, but is not limited to: determining whether or not the source data has the data set of the at least device, and any of the subordinate-groups is associated with the data set of the at least device which is matched to the data set of the at least device of the source data; processing the source data associated with the matched data and the existing data associated with the matched data determining whether or not there is any of the subordinate-groups for deletion; and deleting the subordinate-group marked for deletion or the subordinate-groups marked for deletion if it is determined that there is any of the subordinate-groups for deletion.

In some cases, the computer-implemented method further may include, but is not limited to: determining whether the source data has a data set of at least a submodule of the at least device if it is determined that the first condition is not satisfied and the second condition is satisfied; creating new different subordinate-groups which are subordinate to the main group if it is determined that the source data has the at least submodule; marking all of the subordinate-groups which belongs to the main group for deletion if it is determined that the first condition is satisfied and the second condition is not satisfied; and deleting all of the subordinate-groups.

In some cases, processing the source data from the source application and the existing data in the target application may include, but is not limited to: determining whether there is satisfied a third condition that at least a slot, which is associated with at least one of the subordinate groups for the process field network, has value; and determining whether there is satisfied a fourth condition that the source data is associated with a slot for the process field network.

In some cases, processing the source data from the source application and the existing data in the target application further may include, but is not limited to: determining whether or not there is the source data associated with a slot which is not present in any of the subordinate-groups if it is determined that there are satisfied the third condition and the fourth condition; determining if the source data is associated with the slot if it is determined that there is the source data associated with the slot which is not present in any of the subordinate-groups; and creating new different subordinate-groups which are subordinate to the main group if it is determined that the source data is associated with the slot.

In some cases, processing the source data from the source application and the existing data in the target application further may include, but is not limited to: determining whether or not there is the subordinate-group associated with the slot which is not present in the source data if it is determined that there are satisfied the third condition and the fourth condition; and marking the subordinate-group for deletion if it is determined that the subordinate-group associated with the slot which is not present in the source data.

In some cases, processing the source data from the source application and the existing data in the target application further may include, but is not limited to: determining whether or not the source data is associated with a slot, and any of the subordinate-groups is associated with a slot which is matched to the slot associated with the source data, if it is determined that there are satisfied the third condition and the fourth condition; and processing the source data associated with the matched slot and the existing data associated with the matched slot if it is determined that the source data and any of the subordinate-groups are associated with the matched slot.

In some cases, processing the source data from the source application and the existing data in the target application further may include, but is not limited to: marking the subordinate-group for deletion if it is determined that the subordinate-group associated with the slot which is not present in the source data, if it is determined that the third condition is satisfied and the fourth condition is not satisfied.

In some cases, processing the source data associated with the matched slot and the existing data associated with the matched slot further may include, but is not limited to: determining whether there is satisfied a fifth condition that at least a sub-slot, which is associated with at least one of the subordinate groups for the process field network, has value; and determining whether there is satisfied a sixth condition that the source data is associated with a sub-slot for the process field network.

In some cases, processing the source data from the source application and the existing data in the target application further may include, but is not limited to: determining whether or not the source data is associated with a slot, and any of the subordinate-groups is associated with a slot which is matched to the slot associated with the source data, if it is determined that there are satisfied the third condition and the fourth condition; processing the source data associated with the matched slot and the existing data associated with the matched slot if it is determined that the source data and any of the subordinate-groups are associated with the matched slot; determining whether or not there is the source data associated with a sub-slot which is not present in any of the subordinate-groups if it is determined that there are satisfied the fifth condition and the sixth condition; determining if the source data is associated with at least a sub-slot in the slot if it is determined that there is the source data associated with the slot which is not present in any of the subordinate-groups; creating new different subordinate-groups which are subordinate to the main group if it is determined that the source data has the at least a sub-slot in the slot; determining whether or not there is the subordinate-group associated with the sub-slot which is not present in the source data if it is determined that there are satisfied the fifth condition and the sixth condition; marking the subordinate-group for deletion if it is determined that the subordinate-group associated with the sub-slot which is not present in the source data; determining whether or not the source data is associated with a sub-slot, and any of the subordinate-groups is associated with a sub-slot which is matched to the sub-slot associated with the source data, if it is determined that there are satisfied the fifth condition and the sixth condition; and processing the source data associated with the matched sub-slot and the existing data associated with the matched sub-slot if it is determined that the source data and any of the subordinate-groups are associated with the matched sub-slot.

In some cases, performing the level-by-level comparison between the source data extracted from the source application and the existing data in the subordinate-groups from the target application, if it is determined that there are satisfied both the first condition and the second condition, may include, but is not limited to: determining whether or not the source data having the data set of the at least device is present in any of the subordinate-groups; determining if the at least device has at least a sub-module of the at least device if it is determined that the source data having the at least device is not present in any of the subordinate-groups; creating new different subordinate-groups which are subordinate to the main group if it is determined that the at least device has the at least sub-module; determining whether or not there is any of the subordinate-groups for deletion if it is determined that the at least device is free of the at least sub-module; deleting the subordinate-group marked for deletion or the subordinate-groups marked for deletion if it is determined that there is any of the subordinate-groups for deletion; determining whether or not the subordinate-group having the data set of the at least device is present in the source data; marking the subordinate-group for deletion if it is determined that the subordinate-group having the data set of the at least device is not present in the source data;

determining whether or not there is any of the subordinate-groups marked for deletion; deleting the subordinate-group marked for deletion or the subordinate-groups marked for deletion if it is determined that there is any of the subordinate-groups for deletion; determining whether or not the source data has the data set of the at least device, and any of the subordinate-groups is associated with the data set of the at least device which is matched to the data set of the at least device of the source data; processing the source data associated with the matched data and the existing data associated with the matched data; determining whether or not there is any of the subordinate-groups for deletion; and deleting the subordinate-group marked for deletion or the subordinate-groups marked for deletion if it is determined that there is any of the subordinate-groups for deletion, Furthermore, performing the level-by-level comparison between the source data extracted from the source application and the existing data in the subordinate-groups from the target application, if it is determined that the first condition is not satisfied and the second condition is satisfied, may include, but is not limited to: determining whether the source data has a data set of at least a submodule of the at least device; and creating new different subordinate-groups which are subordinate to the main group if it is determined that the source data has the at least submodule. Moreover, performing the level-by-level comparison between the source data extracted from the source application and the existing data in the subordinate-groups from the target application, if it is determined that the first condition is satisfied and the second condition is not satisfied, may include, but is not limited to: marking all of the subordinate-groups which belongs to the main group for deletion if it is determined that the first condition is satisfied and the second condition is not satisfied; and deleting all of the subordinate-groups. Additionally, processing the source data from the source application and the existing data in the target application further may include, but is not limited to: determining whether or not there is the subordinate-group associated with the slot which is not present in the source data if it is determined that there are satisfied the third condition and the fourth condition; marking the subordinate-group for deletion if it is determined that the subordinate-group associated with the slot which is not present in the source data; determining whether or not there is the source data associated with a slot which is not present in any of the subordinate-groups if it is determined that there are satisfied the third condition and the fourth condition; determining if the source data is associated with the slot if it is determined that there is the source data associated with the slot which is not present in any of the subordinate-groups; creating new different subordinate-groups which are subordinate to the main group if it is determined that the source data is associated with the slot; determining whether or not there is the subordinate-group associated with the slot which is not present in the source data if it is determined that there are satisfied the third condition and the fourth condition; marking the subordinate-group for deletion if it is determined that the subordinate-group associated with the slot which is not present in the source data; determining whether or not the source data is associated with a slot, and any of the subordinate-groups is associated with a slot which is matched to the slot associated with the source data, if it is determined that there are satisfied the third condition and the fourth condition; and processing the source data associated with the matched slot and the existing data associated with the matched slot if it is determined that the source data and any of the subordinate-groups are associated with the matched slot; determining whether there is satisfied a fifth condition that at least a sub-slot, which is associated with at least one of the subordinate groups for the process field network, has value; determining whether there is satisfied a sixth condition that the source data has a data set of at least a device module for the process field network; determining whether or not there is the source data associated with a sub-slot which is not present in any of the subordinate-groups if it is determined that there are satisfied the fifth condition and the sixth condition; determining if the source data is associated with at least a sub-slot in the slot if it is determined that there is the source data associated with the slot which is not present in any of the subordinate-groups; creating new different subordinate-groups which are subordinate to the main group if it is determined that the source data has the at least a sub-slot in the slot; determining whether or not there is the subordinate-group associated with the sub-slot which is not present in the source data if it is determined that there are satisfied the fifth condition and the sixth condition; marking the subordinate-group for deletion if it is determined that the subordinate-group associated with the sub-slot which is not present in the source data; determining whether or not the source data is associated with a sub-slot, and any of the subordinate-groups is associated with a sub-slot which is matched to the sub-slot associated with the source data, if it is determined that there are satisfied the fifth condition and the sixth condition; and processing the source data associated with the matched sub-slot and the existing data associated with the matched sub-slot if it is determined that the source data and any of the subordinate-groups are associated with the matched sub-slot.

In some cases, the computer-implemented method further may include, but is not limited to: combining plural sets of the source data extracted from the source application into a single set of the source data which is to be displayed by a display device as a single set of the target data in the target application, if it is determined that the source data is not supportable by the data structure requirements of the target application.

In some cases, the computer-implemented method further may include, but is not limited to: splitting a set of the source data extracted from the source application into plural sets of the source data to be supportable by the target application, if it is determined that the source data is not supportable by the data structure requirements of the target application.

In other embodiments, a control system in an industrial plant may include, but is not limited to, one or more hardware processors and one or more software components comprising computer-executable instructions, when executed by the one or more hardware processors to cause the one or more hardware processors to perform a method. The method may include, but is not limited to: extracting, based at least in part on a requirement by the target application, source data from a source application; determining whether or not at least a part of the source data extracted from the source application is not matched in terms of data structure with at least a part of target data in the target application; transforming the source data structure to be matched with the target data structure in accordance with a data structure requirement of the target application if it is determined that the at least part of the source data is not matched in terms of data structure with the at least a part of the target data in the target application; performing a hierarchical checking of the data structure between the target application and the source application in a correlated definition status which refers to target parameters of at least one of the target application and a target data file and which refers to source parameters of at least one of the source application and a source data file; and performing at least one of updating, deleting and adding the source data from the source application, based at least in part on a result of the hierarchical checking for merging the source data into the target data in the target application.

In other embodiments, a non-transitory computer readable storage medium that stores a computer-readable program which, when executed by one or more computers, causes the one or more computers to perform a method. The method may include, but is not limited to: extracting, based at least in part on a requirement by the target application, source data from a source application; determining whether or not at least a part of the source data extracted from the source application is not matched in terms of data structure with at least a part of target data in the target application; transforming the source data structure to be matched with the target data structure in accordance with a data structure requirement of the target application if it is determined that the at least part of the source data is not matched in terms of data structure with the at least a part of the target data in the target application; performing a hierarchical checking of the data structure between the target application and the source application in a correlated definition status which refers to target parameters of at least one of the target application and a target data file and which refers to source parameters of at least one of the source application and a source data file; and performing at least one of updating, deleting and adding the source data from the source application, based at least in part on a result of the hierarchical checking for merging the source data into the target data in the target application.

[Overalls of Integrated System to which System and Method for Merging Source Data into Target Data are Applicable]

There will hereinafter be described the overalls of an integrated system to which the above described system and method for merging source data into target data are applicable.

Figure 4A:
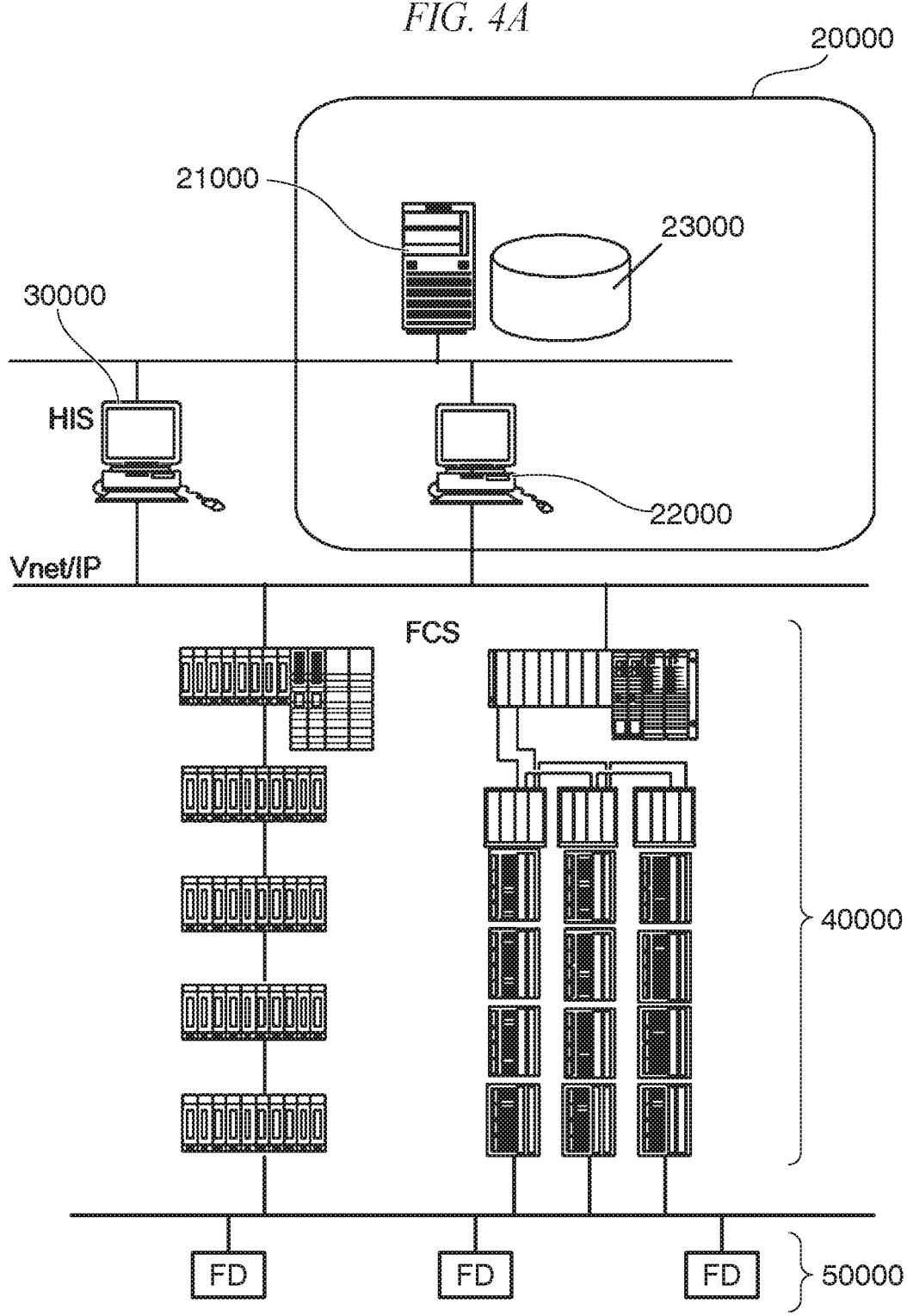
FIG. 4A is a diagram illustrating an integrated system which includes a field control device for controlling a plurality of field devices, an Automation Engineering System, and an interface.
Figure 4B:
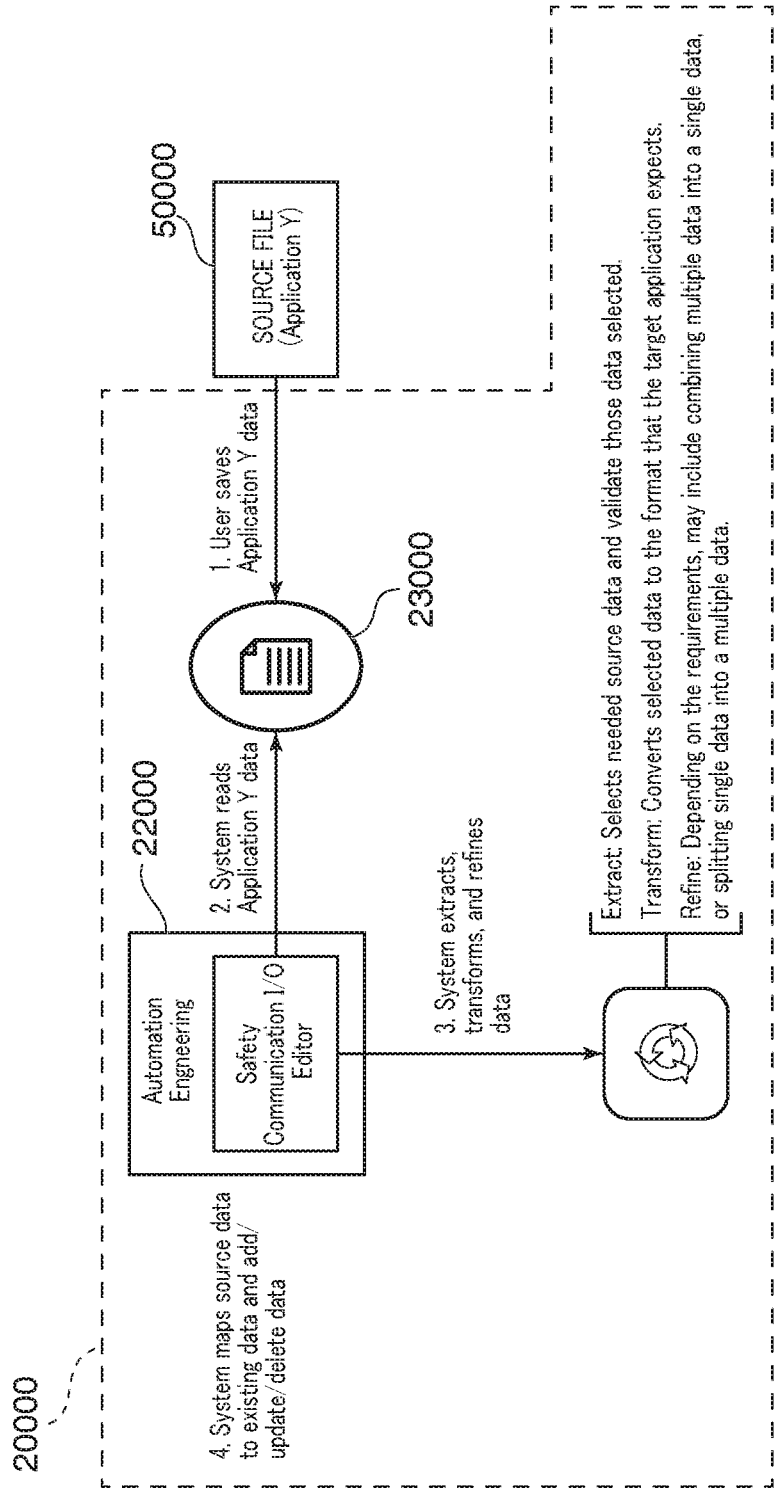
FIG. 4B is a diagram illustrating a sample of an implementation of the Automation Engineering System of FIG. 4A.

FIG. 4A is a diagram illustrating an integrated system which includes a field control device 40000 for controlling a plurality of field devices 50000, an Automation engineering system 2000, and an interface 3000. FIG. 4B is a diagram illustrating a sample of an implementation of the automation engineering system 2000 of FIG. 4A. The interface 3000 may be implemented by, but not limited to, a human interface station (HIS). The interface 3000 may be configured to be communicatively coupled via any available network to the field control device 40000. The interface 3000 is configured to provide an operation environment to operators. The interface 3000 may be configured to be communicatively coupled via the available network to the automation engineering system 2000. The interface 3000 is used by an operator for operating, controlling and managing the field control device 40000 and the automation engineering system 2000. The automation engineering system 2000 may include, at least, but not limited to, an Automation Design Suite 2000. The automation engineering system 2000 may be configured to provide an integrated engineering environment for configuring and maintaining overall control systems, which may include, but are not limited to, plant instrumentation, safety instrumentation, and maintenance management. The automation engineering system 2000 may be configured to provide an engineering environment for configuring and maintaining overall instrumentation including plant instrumentation, safety instrumentation, and maintenance management. The automation engineering system 2000 may be configured to provide new engineering methods in addition to the conventional ones for up to specific devices or systems such as, but not limited to, advanced Distributed Control Systems (DCS). In terms of the embodiments of the method and system for merging the data into the target data, the automation engineering system 2000 or Engineering Tool of the Automation Engineering System 22000 in the automation engineering system 2000 may be configured to merge the data into the target data. The automation engineering system 2000 may include, but is not limited to, an automation design server (The Engineering Server of the Automation Engineering System) 21000, an Engineering Tool of the Automation Engineering System 22000, and a VP builder. The Engineering Tool may include, but is not limited to, an automation design tool such as an automation design organizer. The automation engineering system 2000 may further include, but is not limited to, an automation design master database 2300. The automation design server (The Engineering Server of the Automation Engineering System) 21000 may be configured to manage all the engineering data of the automation engineering system 2000. The Engineering Tool of the Automation Engineering System 22000 may include, but is not limited to, a main software component for engineering for module-based engineering. The automation engineering system 2000 may be configured to centrally manage all system engineering data such as, but not limited to, Distributed Control Systems (DCS)'s engineering data on the automation design server (The Engineering Server of the Automation Engineering System) 21000. The latest design information can be available when expanding, modifying or maintaining the system, which prevents unnecessary engineering work to confirm inconsistencies between the design information and the actual information stored in the system. The engineering server function and the standard engineering function can run on the same computer. Multiple standard engineering functions can be used with a single engineering server function.

The engineering data edited by using the engineering function is stored in the following projects. The automation design (AD) project is a group of data where the engineering data is stored. In the automation engineering system 2000, the engineering data is managed by the automation design (AD) project. The engineering data edited by using the Engineering Tool of the Automation Engineering System 22000 is stored in the automation design (AD) project which is created in the automation design master database 23000 on the automation design server (The Engineering Server of the Automation Engineering System) 21000. Multiple automation design (AD) projects can be created in the automation design master database 23000. The VP project is a group of data where the engineering data edited by the VP builders is stored. The VP project can be created in a computer or a server where the standard engineering function is installed. The VP project becomes available by being registered in the automation design (AD) project. The engineering data of the Engineering Tool of the Automation Engineering System 22000 is stored in the automation design (AD) project while the VP Builder's engineering data is stored in the VP project.

The automation engineering system 2000 may be configured to provide an integrated engineering environment not only for Distributed Control Systems (DCS), but also for all components for instrumentation systems including safety instrumentation systems, field devices, and network devices. The automation engineering system 2000 may be configured to automate and standardize engineering work which are effective for improving working efficiency and reduce engineering errors, and for keeping the information up to date and provide it to users properly.

Module engineering is a distinctive feature of a new engineering method provided by the automation engineering system 2000. Modules are functional applications that can be developed independently from hardware, and contain design information, control logics, tuning parameters, alarm attributes, attached files. Engineering is carried out for each module, and module elements can be managed as a whole. The conventional engineering functions for Distributed Control Systems (DCS) do not cover management of the design information. Therefore, implementation (specific control logics, etc.) deviates from design information during repeated modifications, making it impossible to refer to design information. In contrast, the automation engineering system 2000 defines both design and implementation information in an integrated manner and updates design information and implementation at the same time even during repeated modifications, thus preventing discrepancies. In the module engineering, careful designing of modules is expected to dramatically reduce regression work caused by modifications in the final phase of the engineering, and to reduce risks such as delay in construction and increase in costs. Meanwhile, to reduce the burden of design work for users, the automation engineering system 2000 can be designed to offer industry libraries of modules for reuse that are developed on the basis of engineering know-how, and have been verified.

As an illustrative example and shown in FIG. 4B, Safety Communication I/O editor of Engineering Tool of the Automation Engineering System has the functionality to extract a selected set of PROFINET data/settings from the PROFINET (Application Y) Configurator for it to use and integrate with the other data/settings in the editor via the following steps: 1) User configures source Application Y; 2) Engineering Tool of the Automation Engineering System reads source Application Y's data via the Safety Communication I/O editor button clicks "Read PROFINET Configurator Result' and 'Launch Configurator'; 3) Engineering Tool of the Automation Engineering System extracts, transforms and refines source Application Y's data based on requirement-driven rules; 4) Engineering Tool of the Automation Engineering System maps source data to existing data and add/update/delete data; and 5) Engineering Tool of the Automation Engineering System displays the resulting data on Step 4.

In terms of the embodiments of the method and system for merging the data into the target data, the automation engineering system 2000 or the Engineering Tool of the Automation Engineering System 22000 in the automation engineering system 2000 may be configured to merge the data into the target data.

[Example of System for Merging Source Data into Target Data]

There have been described the overalls of the system and the method for merging source data in source application into target data in target application and then the overalls of the integrated system to which the system and method for merging source data into target data are applicable.

Figure 5:
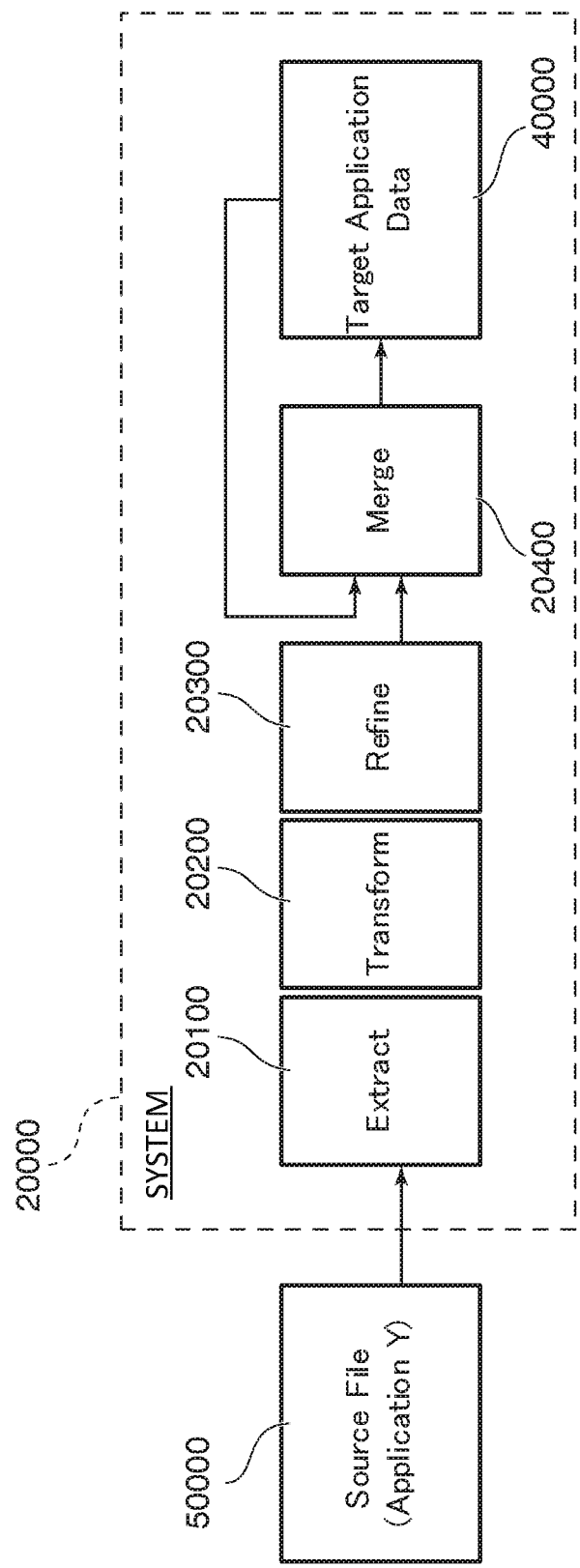
FIG. 5 is a block diagram illustrating the system for merging source data into target data integrated in the Automation Engineering System or an Engineering Tool of the Automation Engineering System in the Automation Engineering System of FIGS. 4A and 4B.

An illustrative example of the system for merging source data into target data integrated in the automation engineering system 2000 or the Engineering Tool of the Automation Engineering System 22000 in the automation engineering system 2000 will be described hereafter. FIG. 5 is a block diagram illustrating the system for merging source data into target data integrated in the automation engineering system 2000 or the Engineering Tool of the Automation Engineering System 22000 in the automation engineering system 2000 of FIGS. 4A and 4B. The system 20000 is configured to extract source data from a source file in a source application 50000 and merge the source data into target data in the target application 4000. The system 20000 includes an extractor 20100, a transformer 20200, a refiner 20300, and a merger 20300. The process for merge the source data in the source file in the source application 50000 into target data in the target application 4000 can be implemented through the extractor 20100, transformer 20200, refiner 20300, and merger 20300, each of which will hereinafter be described in details.

[Extract Source Data from Source Application]

The method may include a process of extraction of source data from a source application. The process may be implemented by one or more hardware processors and one or more software components to be executed by the one or more hardware processors. The system may include an extractor configured to extract source data from a source application. The system may be implemented by one or more hardware processors and one or more software components comprising computer-executable instructions, when executed by the one or more hardware processors to cause the one or more hardware processors to perform the process of extraction of source data from a source application.

The method may extract source data from the source application, based at least in part on a requirement by the target application. In other words, what source data are extracted depend at least in part upon what the target application requires. In some cases, some examples of types or formats of source data or source files may be any available types in formats such as Text, XML, XAML, Excel, CSV, but not limited to any specific type.

The extraction may be performed under some conditions. Examples of the extracting conditions may be that a device module or device modules, hereinafter referred to as a module or modules, must be supported in the target application. In this case, the conditions are used to filter any unsupportable module or modules which are not supported in the target application. In some cases, the supportability of the device module or modules in the target application can depend upon any supportable communication protocol or protocols of a particular network. Examples of the supportable communication protocol or protocols of a particular network may be, but are not limited to, a predefined industrial communication protocol of a process field network such as PROFINET (Registered Trademark) and PROFIBUS.

In some cases, extracting the source data from the source application may include, but is not limited to, selection, determination and validation. The selection can be made to select the source data from the source application based at least in part on a requirement by the target application. The determination can be made to determine whether or not the source data selected is supportable in accordance with a predefined industrial communication protocol of a process field network by the target application. The validation can be made to validate the source data selected if it is determined that the source data selected is supportable in accordance with the predefined industrial communication protocol by the target application.

The determination for determine whether or not the source data selected is supportable in the target application can be implemented by any available ways. In some cases, the determination on the supportability may include, but is not limited to, an extracting rule determination. The extracting rule determination can be made to determine any available extracting rule set under a supporting condition supported by the target application. The supporting condition may include, but is not limited to, the predefined industrial communication protocol of the process field network, such as PROFINET (Registered Trademark), by the target application.

[Transform Data Structure of Source Data to be Matched with Target Application]

The method may include a process of determination of data structure of the extracted source data. The method may include determining whether the data structure of the extracted source data is matched with the data structure of the target application. The method may further include a process of transforming the determined data structure of the extracted source data to be matched with the data structure of the target application. The processes of the determination and the transformation may be implemented by one or more hardware processors and one or more software components to be executed by the one or more hardware processors. The system may include a transformer configured to determine whether the data structure of the extracted source data is matched with the data structure of the target application source data from a source application and to transform the determined data structure of the extracted source data to be matched with the data structure of the target application. The transformer may be implemented by one or more hardware processors and one or more software components comprising computer-executable instructions, when executed by the one or more hardware processors to cause the one or more hardware processors to perform the process of extraction of source data from a source application.

In some cases, the extracted source data or the extracted source data file may have a data structure which is matched with the data structure of the target application. In other cases, the source data structure is not matched with the target data structure. In this cases, the source data structure of the extracted source data or the extracted source data file is transformed to be matched in data structure with the target data or the target file of the target application. Usually, the data structure of the target application can be decided by a pre-defined requirement for data structure in accordance with the standard that the target application complies with. The standard for the data structure may be any available data safety standard. The transformation of the source data structure of the extracted source data or the extracted source data file can be made based at least in part on the pre-defined requirement for data structure in accordance with the standard that the target application complies with. Examples of "Data Structure" may include, but is not limited to, primary indexing such as 1) group name; 2) device name; 3) slot; and 4) sub-slot, and also optional data structure settings such as 5) IP Address, 6) Device Tag, 7) Field Parameter Setting, and 8) Connection Setting.

[Refine Source Data]

The method may include a process of refining of the extracted source data which in some cases were transformed in those data structure to be matched with the data structure of the target application, which were not transformed in those data structure but already matched with the data structure of the target application. The refining process may be classified into two: data combining process and data splitting process. The data combining process can be made to combine plural sets of the source data into a single set of the source data; and splitting a set of the source data. Usually, the data combining process can be made to combine plural sets of the source data extracted from the source application into a single set of the source data which is to be displayed by a display device as a single set of the target data in the target application, if it is determined that the source data is not supportable by the data structure requirements of the target application. The data splitting process can be made to split a set of the source data extracted from the source application into plural sets of the source data to be supportable by the target application. Usually, the data splitting process can be made to a set of the source data extracted from the source application into plural sets of the source data to be supportable by the target application, if it is determined that the source data is not supportable by the target application. The processes of the refining may be implemented by one or more hardware processors and one or more software components to be executed by the one or more hardware processors. The system may include a refiner configured to combine plural sets of the source data extracted from the source application into a single set of the source data which is to be displayed by a display device as a single set of the target data in the target application, if it is determined that the source data is not supportable by the target application, and split a set of the source data extracted from the source application into plural sets of the source data to be supportable by the target application, if it is determined that the source data is not supportable by the data structure requirements of the target application. The refiner may be implemented by one or more hardware processors and one or more software components comprising computer-executable instructions, when executed by the one or more hardware processors to cause the one or more hardware processors to perform the process of extraction of source data from a source application.

In some cases, plural data sets Data A, Data B. and Data C extracted from the source file or files in the source application would need to be displayed as a single data set Data D in the target application. The data combination can be made to combine the plural data sets Data A, Data B. and Data C into the single data set Data D for displaying the single data set Data D in the target application. In some cases, the single data set Data D does not include all of the plural data sets Data A, Data B, and Data C. The single data set Data D can be a part of the plural data sets Data A, Data B, and Data C. The combination of the plural data sets do not always do simply combining plural data sets Data A, Data B, and Data C. In some cases, the combination will create the single data set Data D which is a part of the plural data sets Data A, Data B, and Data C.

In other cases, a single data set Data E from the source file in the sour application would not be acceptable by the target application, or would not comply with a pre-defined requirement by the target application. The single data set Data E from the source file in the sour application would thus need to be split into plural data sets Data E1, Data E2, and Data E3 to be matched with the requirement by the target application. The split can be done in accordance with the pre-defined requirement by the target application. The pre-defined requirement by the target application can also be used for the transformation of the data structure of the source data described above. The transformation may be optional and not essential. In some cases, the transformation may not be made even if it is determined that the data structure of the source data is not matched with the data structure of the target data, In this cases, the refine, for example, the splitting, will be made to match the source data with the target data.

Figure 6A:
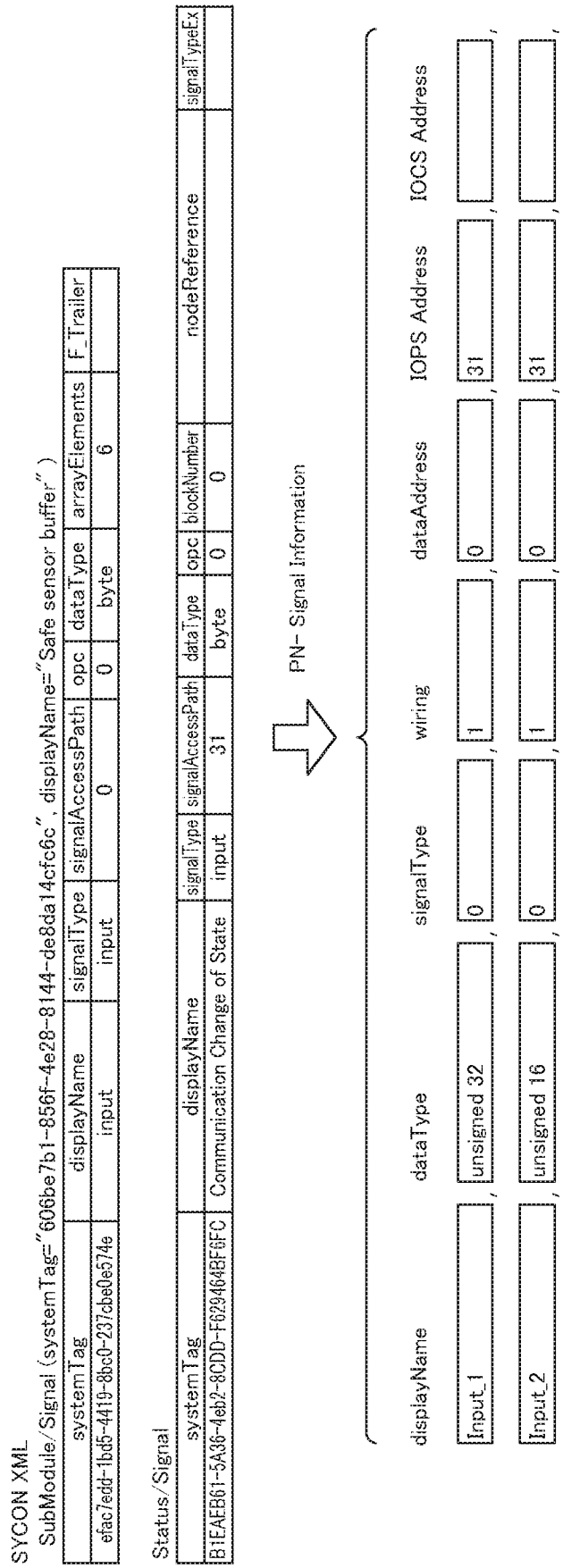
FIG. 6A is a view of an illustrative example of the process of splitting a single set of source data into plural split sets of source data to be merged with the target data.

FIG. 6A is a view of an illustrative example of the process of splitting a single set of source data into plural split sets of source data to be merged with the target data. The process for splitting a single set of source data into plural split sets of source data to be merged with the target data can be made in accordance with a requirement by the target application 40000. As the source application data type size can be larger than that of the target application, then it is required that the source data be split according to the following rule. It should not exceed Unsigned32 (which is 4 bytes). If it exceeds, then the difference should be allocated its own signal. Source signal's data type is array of 6 bytes, which is of size 48 (6*8 where 8 is equivalent to 1 byte). Therefore, target signals should be 1 unsigned32 and 1 unsigned16 respectively.

FIG. 6B is a view of an illustrative example of the process of combining a plurality of sets of source data into a single combined set of source data to be merged with the target data. As source application has more columns than the target application, then it is required that some of the columns be merged to at least 1 column. Source columns display name, datatype, signal type, wiring, data address, IOPS Address and IOCS Address are all combined to be 1 Target column which is PN-Signal Information.

[Merge Source Data into Target Data]

The method may include a process of merging the source data from the source application into the target data in the target application. The process may be implemented by one or more hardware processors and one or more software components to be executed by the one or more hardware processors. The system may include an extractor configured to merge the source data from the source application into the target data in the target application. The system may be implemented by one or more hardware processors and one or more software components comprising computer-executable instructions, when executed by the one or more hardware processors to cause the one or more hardware processors to perform the process of merging the source data from the source application into the target data in the target application.

The merge process of merging the source data from the source application into the target data in the target application may include, but is not limited to, performing a hierarchical checking of the data structure between at least part of the target application and at least part of the source application in a correlated definition status which refers to target parameters of at least one of the target application and a target data file and which refers to source parameters of at least one of the source application and a source data file; and performing at least one of updating, deleting and adding the source data from the source application, based at least in part on a result of the hierarchical checking for merging the source data into the target data in the target application.

The merge process will be described with reference to FIGS. 7 through 16. FIG. 7 through FIG. 13 are data tables showing source data structure and target data structure in each of the steps of the extract, the transform, the refine and the merge as shown in FIG. 5. As described above, the merge process may include, but is not limited to, performing a hierarchical checking of the data structure between at least part of the target application and at least part of the source application in a correlated definition status which refers to target parameters of at least one of the target application and a target data file and which refers to source parameters of at least one of the source application and a source data file; and performing at least one of updating, deleting and adding the source data from the source application, based at least in part on a result of the hierarchical checking for merging the source data into the target data in the target application. The hierarchical checking of the data structure in the correlated definition status may be performed by a level-by-level comparison in the hierarchical structure between the source application and the target application in terms of the correlated definition status which refers to the target parameters of the at least one of the target application and the target data file and which refers to the source parameters of the at least one of the source application and the source data file.

FIG. 7 shows Table 1 illustrating an example of hierarchical data structures of the source data and the target data. The merging step will be based on the results of a "hierarchical" checking of the correlated "definition" status between source application and target application as described in the 3 references Tables. Through the checking performed, updating/deleting/adding action for the target application will be determined and conducted. The correlated "definition" status between source application and target application refers to parameters in the source application (SYCON), and parameters in the target application (the Engineering Tool of the Automation Engineering System). The purpose for "Hierarchical" checking of the correlated "definition" status is carried out is to decide how to merge (update/delete/add) the data from source application (SYCON) with the data in the target application (the Engineering Tool of the Automation Engineering System). "Hierarchical" represents a "leveled" check/comparison, and the checking/comparison according to Table 3, 5, and 6 are carried out sequentially. The way of carrying out the "hierarchical" checking is illustrated in the process flows of FIGS. 14, 15 and 16 to which Tables 3, 5 and 6 correspond, respectively. The updating/deleting/adding actions will be based on the checking/comparing results between the target application and the source application. An example of the data hierarchies of the source application and the target application is illustrated on Table 1 in FIG. 7. The data hierarchy of the source application is controller, device, slot and sub-slot, while the data hierarchy of the target application is main group, subordinate group, slot and sub-slot. An example of the data structures of the source application and the target application is illustrated on Table 2 in FIG. 8. The data structure of the source data is controller, device name, slot value, and sub-slot value. The data structure of the source data is main group name, subordinate group name, device name, slot value and sub-slot value. As shown on Table 3 in FIG. 9 corresponding to the flow chart 14, for example, Group B4, Group B5 in Target Application will be deleted after checking/comparison, as "Device 3" it is not defined in Source Application.

As shown on Table 4 in FIG. 10, in another case, Device 2 and its slots, sub-slots in Source Application will be added to Target Application after checking/comparison, as it is defined in the Source Application, although it is not defined in Target Application. 2 New Group B(s) (B6, B7) will be added and like the following (as device 2 has 2 sub-slots).

Figure 15:
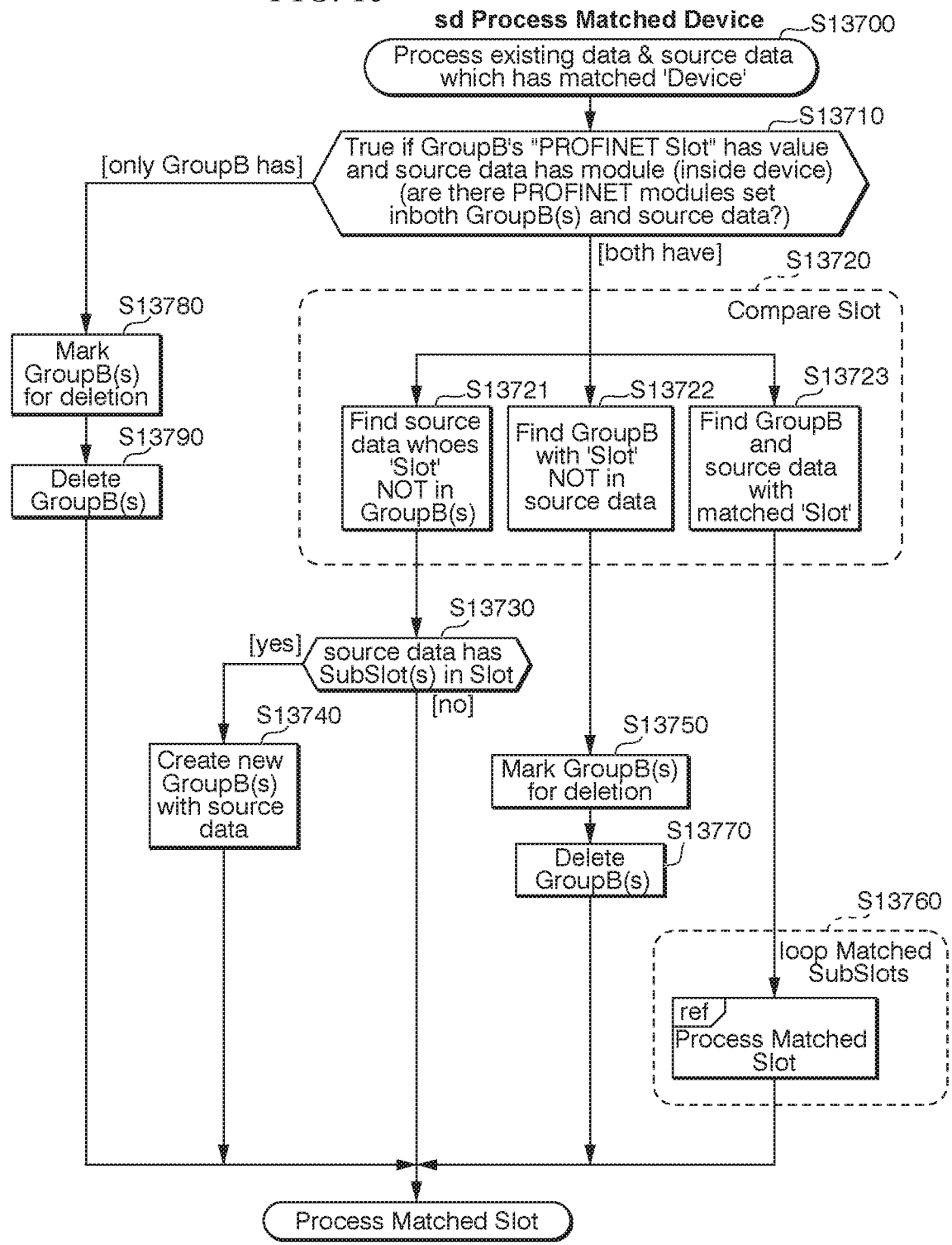
FIG. 15 is a flow chart of processing the source data and the target data both having the matched device in included in the merge process as shown in FIG. 5.

As shown on Table 5 in FIG. 11 corresponding to the flow chart of FIG. 15, Group B1's Device name (Device 1) can be found in Source Application (they have same values for same parameter (Device Name)), therefore, Slots under Device 1 ("child" under "parent") in target application and Slots of Device1 in source application are compared in this leveled comparison.

Figure 16:
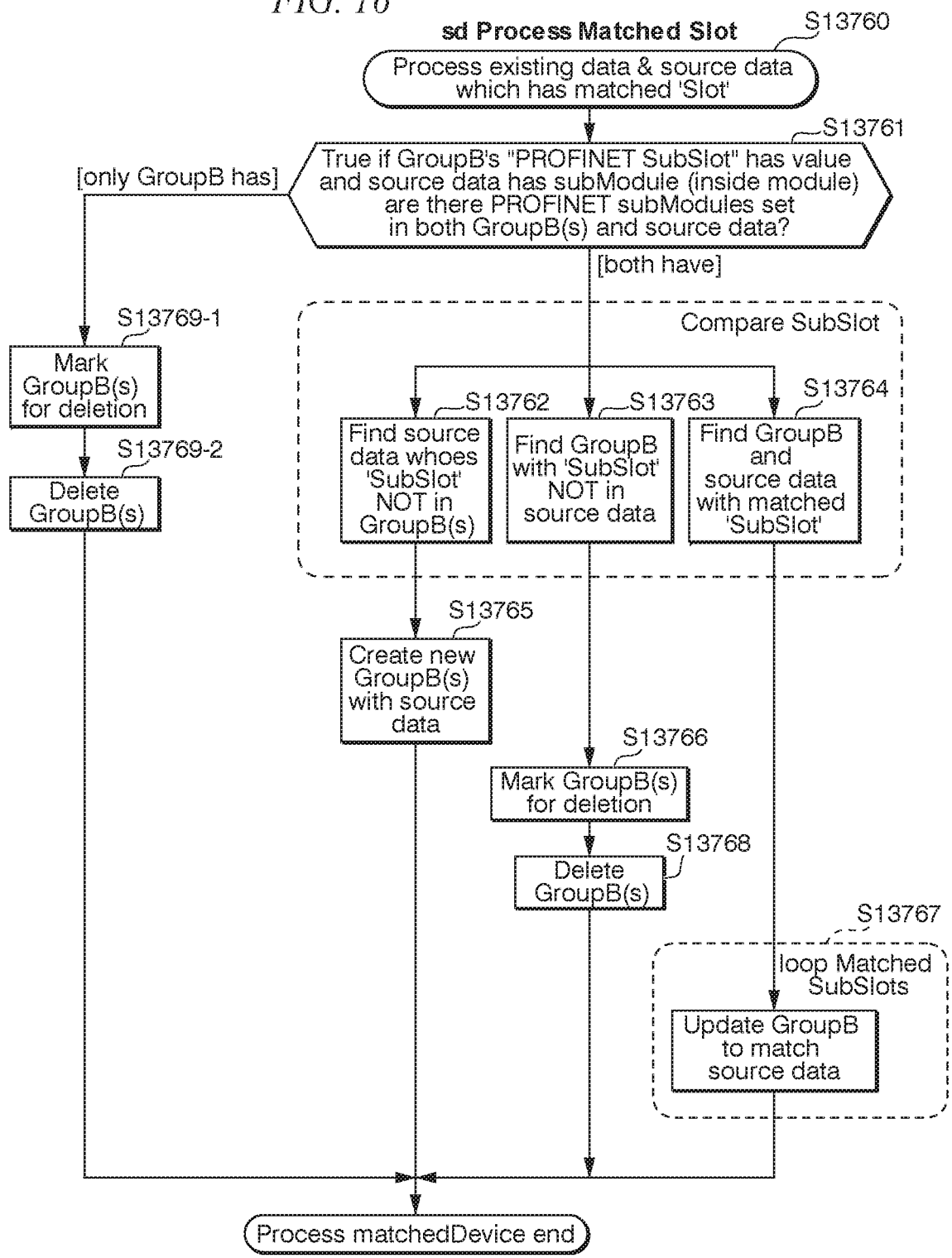
FIG. 16 is a flow chart of processing the source data and the target data both having the matched slot in included in the process for processing the source data and the target data both having the matched device as shown in FIG. 15.

As shown on Table 6 in FIG. 12 corresponding to the flow chart of FIG. 16, Group B1's Device name (Device 1) can be found in Source Application (they have same values for same parameter (Device Name)), and they also both have the same slot value after the comparison in Table 5, herein, proceeding to step of comparing sub-slot under slot ("child" under "parent") in target application and sub-slot of slot of source application.

As shown on Table 5 in FIG. 11 corresponding to the flow chart of FIG. 16, the subordinate group B3 is deleted as the slot value 3 of the subordinate group B3 is not in source application. Regarding the Device1, Slot 2, two subordinate groups B(s) are added as subordinate Groups B8 and B9 in target application as device1 slot 2 has 2 sub-slots. The two subordinate groups B1 and B2 proceed to next level comparison as the two subordinate groups B1 and B2 have the same slot value "1", as the source application.

As shown on Table 7 in FIG. 13 corresponding to the flow chart of FIG. 16, the subordinate group B2 is deleted as sub-slot value 3 of the subordinate group B2 is not present in source application. Regarding the Device 1, Slot 1, Sub-Slot 2, one subordinate group B is added as the one subordinate group B10 is present in target application. The subordinate group B1 is updated by updating other parameter values, which are not related to merging, not presented in the tables. The end results after merging the source data into the target data is shown in Table 7 in FIG. 13.

Figure 14:
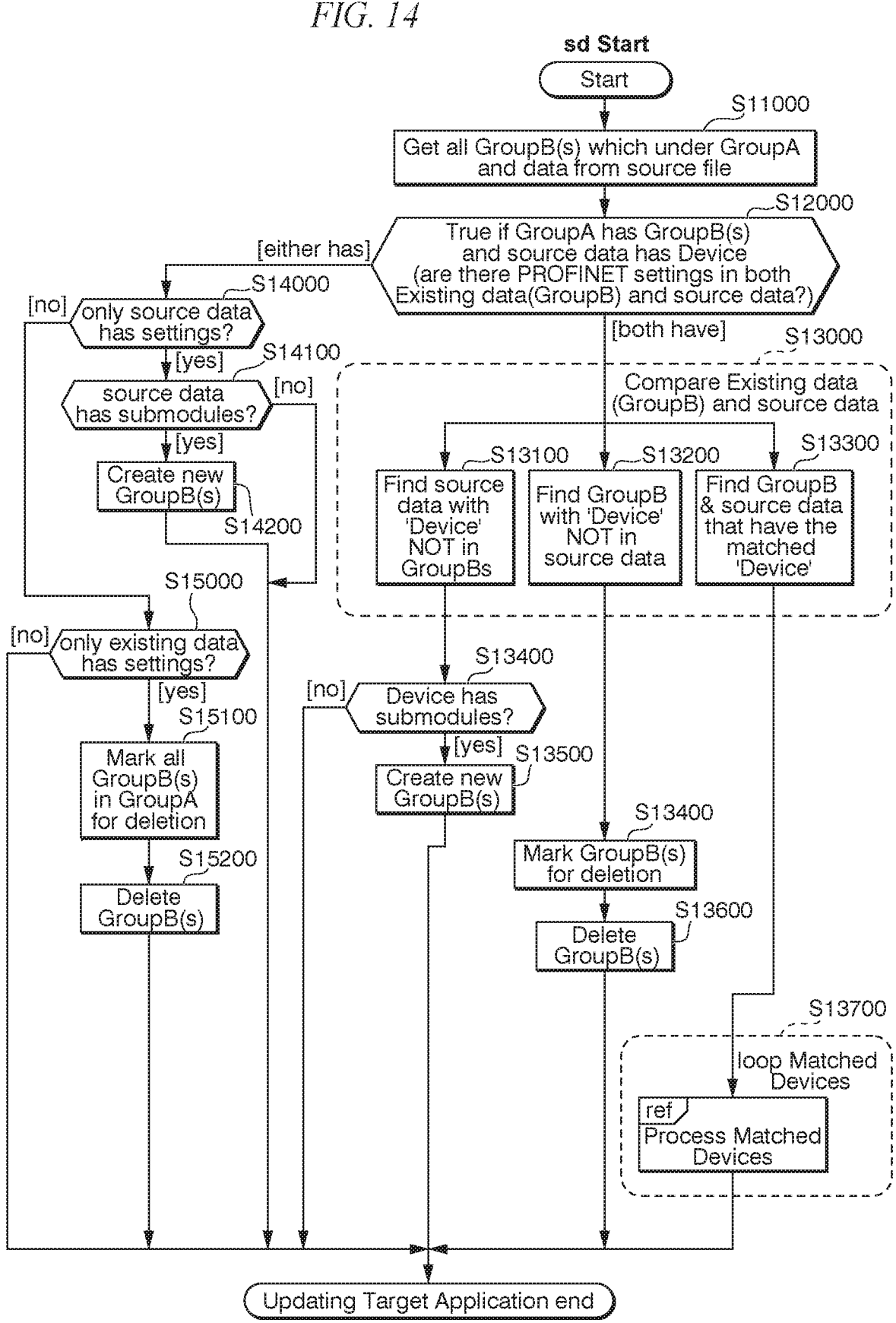
FIG. 14 is a flow chart of the merge process as shown in FIG. 5 and implemented by the Automation Engineering System in FIGS. 4A and 4B.

FIG. 14 is a flow chart of the merge process as shown in FIG. 5 and implemented by the automation engineering system 20000 in FIGS. 4A and 4B. FIG. 15 is a flow chart of processing the source data and the target data both having the matched device in included in the merge process as shown in FIG. 5. FIG. 16 is a flow chart of processing the source data and the target data both having the matched slot in included in the process for processing the source data and the target data both having the matched device as shown in FIG. 15.

As shown in FIG. 14, in Step S11000, all the subordinate groups B which are subordinate to the group A and source data are acquired from the source film 50000. After that, the hierarchical checking of the data structure in the correlated definition status may be performed by a level-by-level comparison in the hierarchical structure between the source application 50000 and the target application 40000 in terms of the correlated definition status which refers to the target parameters of the at least one of the target application and the target data file and which refers to the source parameters of the at least one of the source application and the source data file.

In Step S12000, the level-by-level comparison in the hierarchical structure between the source application 50000 and the target application 40000 includes the determination step, wherein a determination is made of whether or not there is satisfied a first condition that a main group acquired from the target application 40000 has subordinate-groups acquired from the target application 4000, wherein the subordinate-groups are subordinate to the main group; and an additional determination is made of whether or not there is satisfied a second condition that the source data extracted from the source application has a data set of at least a device. If it is determined that there are satisfied both the first condition and the second condition, then the level-by-level comparison is made in the hierarchical structure between the source data extracted from the source application 50000 and existing data in the subordinate-groups from the target application 40000. The first and second conditions may be in some cases that there are PROFINET settings in both existing or target data of the subordinate groups and the source data.

In Step S13000, the level-by-level comparison in the hierarchical structure between the source application 50000 and the target application 40000 includes the determination step, wherein a comparison is made in the device data setting between the source data and the target data if it is determined that there are satisfied both the first condition and the second condition. The target data can also be referred to as existed data which exist in the target application 40000. The comparison is made in the device data setting between the source data and the target data may include the following three processes.

In Step S13100, there is made a determination on whether or not the source data having the data set of the at least device is present in any of the subordinate-groups.

In Step S13400, there is made a determination on whether the at least device has at least a sub-module of the at least device if it is determined that the source data having the at least device is not present in any of the subordinate-groups.

In Step S13500, new different subordinate-groups are created, which are subordinate to the main group if it is determined that the at least device has the at least sub-module.

In Step S13200, there is made a determination on whether or not the source data having the data set of the at least device is not present in any of the subordinate-groups.

Following to Step S13200, there is made a determination on whether or not the subordinate-group having an associated data set of the at least device is present in the source data. The subordinate-group for deletion are marked if it is determined that the subordinate-group having the associated data set of the at least device is not present in the source data.

In Step S13600, there is made a deletion of the subordinate-group marked for deletion or the subordinate-groups marked for deletion if it is determined that there is any of the subordinate-groups for deletion.

In Step S13300, there is made a determination on whether or not the source data has the data set of the at least device, and any of the subordinate-groups is associated with the data set of the at least device which is matched to the data set of the at least device of the source data.

In Step S13700, the source data associated with the matched data and the existing data associated with the matched data are processed, which will be described later with reference to FIG. 15.

In Step S14000, there is made a determination on whether the source data has at least a device setting data set of the at least device, if it is determined that the first condition is not satisfied and the second condition is satisfied.

In Step S14100, there is made a determination on whether the source data has a data set of at least a submodule of the at least device if it is determined that the source data has at least the device setting data set of the at least device.

In Step S14200, there is creating new different subordinate-groups which are subordinate to the main group if it is determined that the source data has the at least submodule.

In Step S15000, there is made a determination on whether the first condition is satisfied and the second condition is not satisfied.

In Step S15100, a process of marking all of the subordinate-groups which belong to the main group for deletion, if it is determined that the first condition is satisfied and the second condition is not satisfied.

In Step S15200, the subordinate-groups marked are deleted.

With reference to FIG. 15, processing the source data from the source application and the existing data in the target application in Step S1370 includes a determination in Step S13710 for determining whether there is satisfied a third condition that at least a slot, which is associated with at least one of the subordinate groups for the process field network, has value; and a determination on whether there is satisfied a fourth condition that the source data is associated with a slot for the process field network. In Step S13721, a determination is made on whether or not there is the source data associated with a slot which is not present in any of the subordinate-groups if it is determined that there are satisfied the third condition and the fourth condition. In Step S13730, a determination is made on whether or not the source data is associated with the slot if it is determined that there is the source data associated with the slot which is not present in any of the subordinate-groups. In Step S13740, new different subordinate-groups are created, which are subordinate to the main group if it is determined that the source data is associated with the slot. In Step S13722, a determination is made on whether or not there is the subordinate-group associated with the slot which is not present in the source data if it is determined that there are satisfied the third condition and the fourth condition. In Step S13750, the subordinate-group are marked for deletion if it is determined that the subordinate-group associated with the slot which is not present in the source data. In Step S13770, the subordinate-group marked for deletion is deleted. Processing the source data from the source application and the existing data in the target application in Step S13710 further include a determination process in Step 13723 for determining whether or not the source data is associated with a slot, and any of the subordinate-groups is associated with a slot which is matched to the slot associated with the source data, if it is determined that there are satisfied the third condition and the fourth condition. In Step S13660, there is made a process for processing the source data associated with the matched slot and the existing data associated with the matched slot if it is determined that the source data and any of the subordinate-groups are associated with the matched slot as shown in FIG. 16.

Processing the source data associated with the matched slot and the existing data associated with the matched slot in Step 13760 includes a step S13761 in which a determination is made on whether there is satisfied a fifth condition that at least a sub-slot, which is associated with at least one of the subordinate groups for the process field network, has value; and a determination is made on whether there is satisfied a sixth condition that the source data has a data set of at least a device sub-module for the process field network.

In Step S13762, a determination is made on whether or not there is the source data associated with a sub-slot which is not present in any of the subordinate-groups if it is determined that there are satisfied the fifth condition and the sixth condition.

In Step S13765, new different subordinate-groups are created which are subordinate to the main group if there is the source data associated with a sub-slot which is not present in any of the subordinate-groups.

In Step S13763, a determination is made on whether or not there is the subordinate-group associated with the sub-slot which is not present in the source data if it is determined that there are satisfied the fifth condition and the sixth condition.

In Step S13766, the subordinate-group is marked for deletion if it is determined that the subordinate-group associated with the sub-slot which is not present in the source data.

In Step S13768, deleting the subordinate-group marked for deletion is deleted.

In Step S13768, a determination is made on whether or not the source data is associated with a sub-slot, and any of the subordinate-groups is associated with a sub-slot which is matched to the sub-slot associated with the source data, if it is determined that there are satisfied the fifth condition and the sixth condition.

In Step S13768, the subordinate-group is updated to match with the source data if the source data is associated with a sub-slot, and any of the subordinate-groups is associated with a sub-slot which is matched to the sub-slot associated with the source data.

The system can improve efficiency to get data from other application through a single user input (single click or one click) to import data from one/more application(s) to the target application. No preparation is required from the user, "one click" could help to select the desired data. The system can handle automatically the target data with the input file automatically. No further manipulation of data is required. The system can provide user-friendly, customizable and error-free importing of data between applications as identification. The system can filter data to obtain what is required for import efficiently. The system can provide fully automatic merging of data more efficiently than filtering and consolidating all data by the user manually. The system can obtain desired data for target application from source file with easiness and accuracy, through implementing a customizable data identification/processing process. No user selection is required to identify and obtain the desired data for the target application.

Some modifications can be available, for example, but not limited to, two or more source files can be the input. Source files can be from two or more applications. Each of the two or more source files can have different format from each other. The transformation can be done before merging the data from the source application to the target application. Conditions for extraction may be a set of rules which are editable configurable. The extraction rules can be stored in a separate file for changing extract rules without reinstall/patch the target application. But, in the current invention, the extraction rules are embedded with the target application, therefore, no changes could be made to the extraction rules, and therefore, not editable.

Each element or device for the game apparatus described above can be implemented by hardware with or without software. In some cases, the game apparatus may be implemented by one or more hardware processors and one or more software components wherein the one or more software components are to be executed by the one or more hardware processors to implement each element or device for the game apparatus. In some other cases, the game apparatus may be implemented by a system of circuits or circuitry configured to perform each operation of each element or device for the game apparatus.

The systems and methods in the above-described embodiments may be deployed in part or in whole through a machine or circuitry that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more processors may enable execution of multiple programs, threads, and codes. The threads may be executed simultaneously to enhance the performance of the one or more processors and to facilitate simultaneous operations of the application.

Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM. ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods, devices, apparatus, and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While certain embodiments of the present inventions have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A computer-implemented method performed by a control system in an industrial plant, the control system comprising one or more hardware processors and one or more software components to be executed by the one or more hardware processors, the method comprising:
    extracting source data from a source application based at least in part on a requirement by a target application;
    determining whether or not the source data selected is supportable in accordance with a specific industrial communication protocol of a specific process field network by the target application;
    in response to the source data being supportable, determining a source data structure of the extracted source data based on source parameters in the source application and whether the source data structure matches a target data structure of target data of the target application;
    in response to the source data structure not matching the target data structure, reading, by the one or more hardware processors, the source parameters in the source application and target parameters of the target application and determining a source parameter whose value matches a value of a target parameter based on the read source and target parameters, the determined source and target parameters being parent source and target parameters, respectively;

determining, by the one or more hardware processors, child target parameters of the parent target parameter from the read target parameters; and performing a level-by-level comparison in a hierarchical checking and merging the source data into the target data by:

iteratively corn paring, by the one or more hardware processors, values of the parent target parameter with values of the source parent parameter, and in response to the value of the parent target parameter not being present in the values of the source target parameter, deleting the value of the parent target parameter and values of child target parameters thereof from the target data, and in response to a value of the source parent parameter not being present in the values of the target parent parameter, adding the value of the parent source parameter and child source parameters thereof to the target data;

in response to the value of the target parent parameter being present in the values of the source parent parameter, iteratively comparing values of child target parameters of the parent target parameter with values of child source parameters of the parent source parameter, and selectively deleting values of the child target parameter and values of child target parameters thereof from the target data, selectively adding values of the child source parameter and values of child source parameters thereof to the target data, or selectively updating values of the child target parameter with values of the child source parameter, based on the comparison of the values of the child target and child source parameters.

2. The computer-implemented method according to claim 1, wherein performing the level-by-level comparison in the hierarchical structure and merging the source data into the target data comprises:

determining whether or not there is satisfied a first condition that a main group acquired from the target application has subordinate-groups acquired from the target application, wherein the subordinate-groups are subordinate to the main group;

determining whether or not there is satisfied a second condition that the source data extracted from the source application has a data set of at least a device; and in response to both the first condition and the second condition being satisfied, performing the level-by-level comparison in the hierarchical structure between the source data and target data in the subordinate-groups from the target application;

in response to the first condition not being satisfied and the second condition being satisfied, determining whether the source data has a data set of at least a submodule of the at least a device that is not in the target application, and in response to the source data having the data set of the at least a submodule that is not in the target application, creating new different subordinate-groups in the target application which are subordinate to the main group; and in response to the first condition being satisfied and the second condition not being satisfied, marking all of the subordinate-groups which belong to the main group of the target application for deletion, and deleting all of the marked subordinate-groups from the target application.

3. The computer-implemented method according to claim 2, wherein performing the level-by-level comparison between the source data extracted from the source application and the target data in the subordinate-groups from the target application if it is determined that there are satisfied both the first condition and the second condition comprises:

determining whether or not the source data having the data set of at least the device is present in any of the subordinate-groups;

determining whether or not the at least device has at least a sub-module of the at least device if it is determined that the source data having at least the device is not present in any of the subordinate-groups; and creating new different subordinate-groups which are subordinate to the main group if it is determined that the at least device has the at least sub-module.

4. The computer-implemented method according to claim 2, wherein performing the level-by-level comparison between the source data extracted from the source application and the target data in the subordinate-groups from the target application if it is determined that there are satisfied both the first condition and the second condition comprises:

determining whether or not the subordinate-group having an associated data set of at least the device is present in the source data;

marking the subordinate-group for deletion if it is determined that the subordinate-group having the associated data set of at least the device is not present in the source data; and deleting the subordinate-group marked for deletion or the subordinate-groups marked for deletion if it is determined that there is any of the subordinate-groups for deletion.

5. The computer-implemented method according to claim 3, wherein performing the level-by-level comparison between the source data extracted from the source application and the target data in the subordinate-groups from the target application if it is determined that there are satisfied both the first condition and the second condition comprises:

determining whether or not the subordinate-group having the data set of at least the device is present in the source data;

marking the subordinate-group for deletion if it is determined that the subordinate-group having the data set of at least the device is not present in the source data;

determining whether or not there is any of the subordinate-groups marked for deletion; and deleting the subordinate-group marked for deletion or the subordinate-groups marked for deletion if it is determined that there is any of the subordinate-groups for deletion.

6. The computer-implemented method according to claim 5, wherein performing the level-by-level comparison between the source data extracted from the source application and the target data in the subordinate-groups from the target application if it is determined that there are satisfied both the first condition and the second condition comprises:

determining whether or not the source data has the data set of the at least device, and any of the subordinate-groups is associated with the data set of the at least device which is matched to the data set of the at least device of the source data;

processing the source data associated with the matched data and the target data associated with the matched data;

determining whether or not there is any of the subordinate-groups for deletion; and deleting the subordinate-group marked for deletion or the subordinate-groups marked for deletion if it is determined that there is any of the subordinate-groups for deletion.

7. The computer-implemented method according to claim 2, wherein performing the level-by-level comparison between the source data extracted from the source application and the target data in the subordinate-groups from the target application if it is determined that there are satisfied both the first condition and the second condition comprises:
  determining whether or not the source data has the data set of the at least device, and any of the subordinate-groups is associated with the data set of the at least device which is matched to the data set of the at least device of the source data;
  processing the source data associated with the matched data and the target data associated with the matched data;
  determining whether or not there is any of the subordinate-groups for deletion; and
  deleting the subordinate-group for deletion or the subordinate-groups marked for deletion if it is determined that there is any of the subordinate-groups for deletion.

8. The computer-implemented method according to claim 3, wherein performing the level-by-level comparison between the source data extracted from the source application and the target data in the subordinate-groups from the target application if it is determined that there are satisfied both the first condition and the second condition comprises:
  determining whether or not the source data has the data set of the at least device, and any of the subordinate-groups is associated with the data set of the at least device which is matched to the data set of the at least device of the source data;
  processing the source data associated with the matched data and the target data associated with the matched data;
  determining whether or not there is any of the subordinate-groups for deletion; and
  deleting the subordinate-group marked for deletion or the subordinate-groups marked for deletion if it is determined that there is any of the subordinate-groups for deletion.

9. The computer-implemented method according to claim 7, wherein processing the source data associated with the matched data and the target data associated with the matched data comprises:
  determining whether there is satisfied a third condition that at least a slot, which is associated with at least one of the subordinate groups for the process field network, has value; and
  determining whether there is satisfied a fourth condition that the source data is associated with a slot for the process field network.

10. The computer-implemented method according to claim 9, wherein processing the source data associated with the matched data and the target data associated with the matched data further comprises:
  determining whether or not there is the source data associated with a slot which is present in any of the subordinate-groups if it is determined that there are satisfied the third condition and the fourth condition;
  determining whether or not the source data is associated with the slot if it is determined that there is the source data associated with the slot which is present in any of the subordinate-groups; and
  creating new different subordinate-groups which are subordinate to the main group if it is determined that the source data is associated with the slot.

11. The computer-implemented method according to claim 9, wherein processing the source data from the source application and the target data in the target application further comprises:
  determining whether or not there is the subordinate-group associated with the slot which is not present in the source data if it is determined that there are satisfied the third condition and the fourth condition;
  marking the subordinate-group for deletion if it is determined that the subordinate-group associated with the slot which is not present in the source data; and
  deleting the subordinate-group marked for deletion.

12. The computer-implemented method according to claim 10, wherein processing the source data from the source application and the target data in the target application further comprises:
  determining whether or not there is the subordinate-group associated with the slot which is not present in the source data if it is determined that there are satisfied the third condition and the fourth condition; and
  marking the subordinate-group for deletion if it is determined that the subordinate-group associated with the slot which is not present in the source data.

13. The computer-implemented method according to claim 9, wherein processing the source data from the source application and the target data in the target application further comprises:
  determining whether or not the source data is associated with a slot, and any of the subordinate-groups is associated with a slot which is matched to the slot associated with the source data, if it is determined that there are satisfied the third condition and the fourth condition; and
  processing the source data associated with the matched slot and the target data associated with the matched slot if it is determined that the source data and any of the subordinate-groups are associated with the matched slot.

14. The computer-implemented method according to claim 10, wherein processing the source data from the source application and the target data in the target application further comprises:
  determining whether or not the source data is associated with a slot, and any of the subordinate-groups is associated with a slot which is matched to the slot associated with the source data, if it is determined that there are satisfied the third condition and the fourth condition; and
  processing the source data associated with the matched slot and the target data associated with the matched slot if it is determined that the source data and any of the subordinate-groups are associated with the matched slot.

15. The computer-implemented method according to claim 11, wherein processing the source data from the source application and the target data in the target application further comprises:
  determining whether or not the source data is associated with a slot, and any of the subordinate-groups is associated with a slot which is matched to the slot associated with the source data, if it is determined that there are satisfied the third condition and the fourth condition; and processing the source data associated with the matched slot and the target data associated with the matched slot if it is determined that the source data and any of the subordinate-groups are associated with the matched slot.

16. The computer-implemented method according to claim 12, wherein processing the source data from the source application and the target data in the target application further comprises:
determining whether or not the source data is associated with a slot, and any of the subordinate-groups is associated with a slot which is matched to the slot associated with the source data, if it is determined that there are satisfied the third condition and the fourth condition; and
processing the source data associated with the matched slot and the target data associated with the matched slot if it is determined that the source data and any of the subordinate-groups are associated with the matched slot.

17. The computer-implemented method according to claim 9, wherein processing the source data from the source application and the target data in the target application further comprises:
determining the subordinate-group for deletion if it is determined that the subordinate-group associated with the slot which is not present in the source data, if it is determined that the third condition is satisfied and the fourth condition is not satisfied; and
deleting the subordinate-group marked for deletion.

18. The computer-implemented method according to claim 13, wherein processing the source data associated with the matched slot and the target data associated with the matched slot further comprises:
determining whether there is satisfied a fifth condition that at least a sub-slot, which is associated with at least one of the subordinate groups for the process field network, has value; and
determining whether there is satisfied a sixth condition that the source data has a data set of at least a device sub-module for the process field network.

19. The computer-implemented method according to claim 18, wherein processing the source data from the source application and the target data in the target application further comprises:
determining whether or not the source data is associated with a slot, and any of the subordinate-groups is associated with a slot which is matched to the slot associated with the source data, if it is determined that there are satisfied the third condition and the fourth condition;
processing the source data associated with the matched slot and the target data associated with the matched slot if it is determined that the source data and any of the subordinate-groups are associated with the matched slot;
determining whether or not there is the source data associated with a sub-slot which is not present in any of the subordinate-groups if it is determined that there are satisfied the fifth condition and the sixth condition;
creating new different subordinate-groups which are subordinate to the main group if there is the source data associated with a sub-slot which is not present in any of the subordinate-groups;
determining whether or not there is the subordinate-group associated with the sub-slot which is not present in the source data if it is determined that there are satisfied the fifth condition and the sixth condition;
marking the subordinate-group for deletion if it is determined that the subordinate-group associated with the sub-slot which is not present in the source data;
deleting the subordinate-group marked for deletion;
determining whether or not the source data is associated with a sub-slot, and any of the subordinate-groups is associated with a sub-slot which is matched to the sub-slot associated with the source data, if it is determined that there are satisfied the fifth condition and the sixth condition; and
updating the subordinate-group to match with the source data if the source data is associated with a sub-slot, and any of the subordinate-groups is associated with a sub-slot which is matched to the sub-slot associated with the source data.

20. The computer-implemented method according to claim 2, further comprising:
determining whether or not at least a part of the source data extracted from the source application is not matched in terms of data structure with at least a part of target data in the target application; and
transforming the source data structure to be matched with the target data structure in accordance with a data structure requirement of the target application if it is determined that the at least part of the source data is not matched in terms of data structure with the at least a part of the target data in the target application.

21. The computer-implemented method according to claim 20, further comprising:
combining plural sets of the source data extracted from the source application into a single set of the source data which is to be displayed by a display device as a single set of the target data in the target application, if it is determined that the source data is not supportable by the data structure requirements of the target application.

22. The computer-implemented method according to claim 20, further comprising:
splitting a set of the source data extracted from the source application into plural sets of the source data to be supportable by the target application, if it is determined that the source data is not supportable by the data structure requirements of the target application.

23. The non-transitory computer readable storage medium according to claim 2, wherein performing the level-by-level comparison in the hierarchical structure and merging the source data into the target data comprises:
determining whether or not there is satisfied a first condition that a main group acquired from the target application has subordinate-groups acquired from the target application, wherein the subordinate-groups are subordinate to the main group;
determining whether or not there is satisfied a second condition that the source data extracted from the source application has a data set of at least a device; and
in response to both the first condition and the second condition being satisfied, performing the level-by-level comparison in the hierarchical structure between the source data and target data in the subordinate-groups from the target application;
in response to the first condition not being satisfied and the second condition being satisfied, determining whether the source data has a data set of at least a submodule of the at least a device that is not in the target application, and in response to the source data having the data set of the at least a submodule that is not in the target application, creating new different subordinate-groups in the target application which are subordinate to the main group; and in response to the first condition being satisfied and the second condition not being satisfied, marking all of the subordinate-groups which belong to the main group of the target application for deletion, and deleting all of the marked subordinate-groups from the target application.

24. A control system in an industrial plant, the control system comprising one or more hardware processors and one or more software components comprising computer-executable instructions, when executed by the one or more hardware processors to cause the one or more hardware processors to perform a method comprising:

extracting source data from the source application based at least in part on a requirement by a target application;

determining whether or not the source data selected is supportable in accordance with a specific industrial communication protocol of a specific process field network by the target application;

in response to the source data being supportable, determining a source data structure of the extracted source data based on source parameters in the source application and whether the source data structure matches a target data structure of target data of the target application;

in response to the source data structure not matching the target data structure, reading, by the one or more hardware processors, the source parameters in the source application and target parameters of the target application and determining a source parameter whose value matches a value of a target parameter based on the read source and target parameters, the determined source and target parameters being parent source and target parameters, respectively;

determining, by the one or more hardware processors, child target parameters of the parent target parameter from the read target parameters; and performing a level-by-level comparison in a hierarchical checking and merging the source data into the target data by:

iteratively comparing, by the one or more hardware processors, values of the parent target parameter with values of the source parent parameter, and in response to the value of the parent target parameter not being present in the values of the source target parameter, deleting the values of the parent target parameter and values of child target parameters thereof from the target data, and in response to a value of the source parent parameter not being present in the values of the target parent parameter, adding the value of the parent source parameter and child source parameters thereof to the target data;

in response to the value of the target parent parameter being present in the values of the source parent parameter, iteratively comparing values of child target parameters of the parent target parameter with values of child source parameters of the parent source parameter, and selectively deleting values of the child target parameter and values of child target parameters thereof from the target data, selectively adding values of the child source parameter and values of child source parameters thereof to the target data, or selectively updating values of the child target parameter with values of the child source parameter, based on the comparison of the values of the child target and child source parameters, wherein the computer-implemented system is configured to be communicatively coupled to a field control device which is configured to control at least one field device, and the computer-implemented system is configured to send the target data as merged to the field control device.

25. A non-transitory computer readable storage medium that stores a computer-readable program which, when executed by one or more hardware computer of a control system in an industrial plant, causes the one or more computers to perform a method comprising:

extracting source data from the source application based at least in part on a requirement by a target application;

determining whether or not the source data selected is supportable in accordance with a specific industrial communication protocol of a specific process field network by the target application;

in response to the source data being supportable, determining a source data structure of the extracted source data based on source parameters in the source application and whether the source data structure matches a target data structure of target data of the target application;

in response to the source data structure not matching the target data structure, reading, by the one or more hardware processors, the source parameters in the source application and target parameters of the target application and determining a source parameter whose value matches a value of a target parameter based on the read source and target parameters, the determined source and target parameters being parent source and target parameters, respectively;

determining, by the one or more hardware processors, child target parameters of the parent target parameter from the read target parameters; and performing a level-by-level comparison in a hierarchical checking and merging the source data into the target data by:

iteratively comparing, by the one or more hardware processors, values of the parent target parameter with values of the source parent parameter, and in response to the value of the parent target parameter not being present in the values of the source target parameter, deleting the values of the parent target parameter and values of child target parameters thereof from the target data, and in response to a value of the source parent parameter not being present in the values of the target parent parameter, adding the value of the parent source parameter and child source parameters thereof to the target data;

in response to the value of the target parent parameter being present in the values of the source parent parameter, iteratively comparing values of child target parameters of the parent target parameter with values of child source parameters of the parent source parameter, and selectively deleting values of the child target parameter and values of child target parameters thereof from the target data, selectively adding values of the child source parameter and values of child source parameters thereof to the target data, or selectively updating values of the child target parameter with values of the child source parameter, based on the comparison of the values of the child target and child source parameters.

26. The control system according to claim 25, wherein performing the level-by-level comparison in the hierarchical structure and merging the source data into the target data comprises:

determining whether or not there is satisfied a first condition that a main group acquired from the target application has subordinate-groups acquired from the target application, wherein the subordinate-groups are subordinate to the main group;

determining whether or not there is satisfied a second condition that the source data extracted from the source application has a data set of at least a device; and in response to both the first condition and the second condition being satisfied, performing the level-by-level comparison in the hierarchical structure between the source data and target data in the subordinate-groups from the target application;

in response to the first condition not being satisfied and the second condition being satisfied, determining whether the source data has a data set of at least a submodule of the at least a device that is not in the target application, and in response to the source data having the data set of the at least a submodule that is not in the target application, creating new different subordinate-groups in the target application which are subordinate to the main group; and in response to the first condition being satisfied and the second condition not being satisfied, marking all of the subordinate-groups which belong to the main group of the target application for deletion, and deleting all of the marked subordinate-groups from the target application.

\* \* \* \* \*